(12) United States Patent
Honma et al.

(10) Patent No.: US 8,299,158 B2
(45) Date of Patent: Oct. 30, 2012

(54) POLYESTER RESIN COMPOSITION, PROCESS FOR PRODUCING THE SAME, AND POLYESTER FILM

(75) Inventors: Yoshihiro Honma, Higashihiroshima (JP); Jun Sakamoto, Mishima (JP); Masahiro Kimura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 657 days.

(21) Appl. No.: 11/597,895

(22) PCT Filed: May 24, 2005

(86) PCT No.: PCT/JP2005/009430
§ 371 (c)(1),
(2), (4) Date: Nov. 29, 2006

(87) PCT Pub. No.: WO2005/116108
PCT Pub. Date: Dec. 8, 2005

(65) Prior Publication Data
US 2008/0076863 A1    Mar. 27, 2008

(30) Foreign Application Priority Data

May 31, 2004  (JP) ................................ 2004-160735
May 31, 2004  (JP) ................................ 2004-160737
Sep. 8, 2004   (JP) ................................ 2004-260816

(51) Int. Cl.
*C08G 73/10*    (2006.01)
(52) U.S. Cl. ........ 524/323; 524/398; 524/414; 524/439; 524/440; 528/272

(58) Field of Classification Search .................... 524/398
See application file for complete search history.

(56) References Cited

U.S. PATENT DOCUMENTS

| | | | |
|---|---|---|---|
| 2003/0109667 A1* | 6/2003 | Fujimori et al. | ............... 528/272 |
| 2003/0144459 A1* | 7/2003 | Fujimori et al. | ............... 528/275 |

FOREIGN PATENT DOCUMENTS

| | | | |
|---|---|---|---|
| JP | 11-106490 | * | 4/1999 |
| JP | 2000-336156 | * | 12/2000 |
| JP | 2001-081175 | * | 3/2001 |
| JP | 2003-119271 A | | 4/2003 |
| JP | 2004-123917 A | | 4/2004 |

OTHER PUBLICATIONS

Derwent abstract of Kitagawa JP 11-106490.*
Machine translation of JP 2001-081175.*
Derwent Abstract of JP 2001-081175.*
Machine translation of JP 2000-336156.*

* cited by examiner

*Primary Examiner* — Doris Lee
(74) *Attorney, Agent, or Firm* — Birch, Stewart, Kolasch & Birch, LLP

(57) ABSTRACT

A polyester resin composition having an equivalent spherical diameter of 1 mm to 50 mm, a degree of crystallization of not less than 65% and less than 99%, an intrinsic viscosity of not more than 0.7 dl/g and a cyclic trimer content of not more than 0.4% by weight. This polymer resin composition has an excellent color tone, causes no significant viscosity lowering or viscosity rise, and can withstand a process which is exposed to a long-term thermal history. A polyester resin composition having a viscosity suitable for extrusion in a general-purpose manner, a production process thereof, and a polyester film are also provided.

14 Claims, No Drawings

POLYESTER RESIN COMPOSITION, PROCESS FOR PRODUCING THE SAME, AND POLYESTER FILM

TECHNICAL FIELD OF THE INVENTION

The present invention relates to a polyester resin composition, a process for producing the same, and a polyester film, and more specifically, to a polyester resin composition in which the content of cyclic compound (oligomer) is little and the color tone is good and which has a viscosity for extrusion in a general-purpose manner, and a process for producing the same, and a polyester film.

BACKGROUND ART OF THE INVENTION

Generally, a polyester is a linear polymer synthesized from a dicarboxylic acid or an ester-forming derivative thereof and a diol or an ester-forming derivative thereof. However, as described in, for example, Non-Patent document 1, a cyclic compound is generated in a linear polymer based on the equilibrium. It is known that the cyclic compound is a low-molecular substance, it is precipitated in a polyester forming process, or precipitated on a surface of a product freely in time, in particular, it is much extracted in a forming process or a processing process or in a case where a solvent is used at the time of using a product, and it causes various troubles.

For example, in a case of a base film for magnetic recording media, large protrusions are formed by the precipitation of cyclic compound and the magnetic recording may be damaged, or in a case of an optical base film, the cyclic compound is precipitated by heating in a processing process and it may generate an optical turbidity or a calescence point, or in a case of a film laminated with a steel plate, a bloom may be generated in the appearance after lamination to the steel plate.

These cyclic compounds have been informed variously, and for example, as to polyethylene terephthalate, it is informed in, for example, Non-Patent document 2, that the main component of the cyclic compound is a cyclic trimer and it is generated by an equilibrium reaction at the time of condensation polymerization of polyethylene terephthalate.

For the above-described problem, for example, in Patent documents 1 to 10, a method for a solid phase polymerization of a polyester resin at a temperature of not higher than the melting point at a reduced-pressure condition in an inert gas atmosphere is proposed.

However, in such a technology wherein the cyclic compound is reduced by the solid phase polymerization, although the amount of the cyclic compound is certainly reduced, because at the same time the condensation polymerization of the polyester progresses and the rise of the polymerization degree becomes great, the prepared material is not suitable as a raw material for producing a formed product little in content of cyclic compound.

Namely, if the polymerization degree of polyester becomes great, at the time of forming, the viscosity of the molten polymer becomes high, and therefore, the load at the time of extrusion becomes large or the polymer temperature rises by exothermic ascribed to shear, and a problem such as thermal decomposition occurs.

In order to solve such a problem, proposed are a method for adjusting the pressure reduction degree at the time of solid phase polymerization (Patent document 11), a method for adjusting the flow rate of inert gas (Patent document 12), a method for heating by an inert gas atmosphere containing a glycol component (Patent document 13) and further a method for heating under a condition of an inert gas atmosphere after removing fine or film-like substances (Patent document 14). Even in these methods, however, because the polymerization degree of the polyester obtained varies, it has been very difficult to obtain a polyester with a constant quality industrially.

Further, although Patent document 15 describes a technology for reducing a cyclic compound by heat treatment in an inert gas atmosphere, even in this method, the amount of a cyclic trimer can be certainly reduced, but there is a problem that the polymer is colored.

Non-Patent document 1: "Polymer Chemistry" written by P. J. Flory, (translated by Oka and Kanemaru, published by Maruzen Publisher Corporation) p90-97
Non-Patent document 2: "Saturated Polyester Resin Hand Book" written by Kazuo Yuki, (Nikkan Kogyo Newspaper Corporation) p167-178
Patent document 1: Japanese Patent 3418987
Patent document 2: JP-A-2003-306538
Patent document 3: JP-A-2001-172372
Patent document 4: JP-A-11-199660
Patent document 5: JP-A-9-249744
Patent document 6: JP-A-9-59362
Patent document 7: JP-A-6-234834
Patent document 8: JP-B-51-48505
Patent document 9: JP-A-49-101462
Patent document 10: JP-A-53-101092
Patent document 11: JP-A-55-89331°
Patent document 12: JP-A-55-89330
Patent document 13: JP-A-8-120062
Patent document 14: JP-A-2002-173528
Patent document 15: Japanese Patent 2745676

DISCLOSURE OF THE INVENTION

Problems to be solved by the Invention

An object of the present invention is to solve the above-described conventional problems and to provide a polyester resin composition in which the content of cyclic compound is little, which is excellent in color tone and causes no significant viscosity lowering and viscosity rise, and can withstand a process which is exposed to a long-term thermal history, and which is suitable for forming by extrusion, a process for producing the same, and a polyester film.

Means for Solving the Problems

The above-described object of the present invention can be achieved by the following means.

A polyester resin composition having an equivalent spherical diameter of 1 mm to 50 mm, a degree of crystallization of not less than 65% and less than 99%, an intrinsic viscosity of not more than 0.7 dl/g and a content of a cyclic trimer of not more than 0.4% by weight. A process for producing a polyester resin composition wherein, when a polyester resin composition containing an antioxidant is heat treated, a temperature for the heat treatment is controlled at a temperature in a range of a melting point of the polyester resin composition to a temperature lower than the melting point by 80° C., and an atmosphere for the heat treatment is controlled so that a degree of flow of an inert gas becomes not more than 1 liter/hr per 1 kg of the polyester resin composition.

A polyester resin composition wherein a content of a cyclic trimer is in a range of 0.1 to 0.7% by weight, a content of a carboxylic end group is in a range of 15 to 40 equivalent/ton, an intrinsic viscosity is in a range of 0.55 to 0.80, and an absorbance at a wavelength of 365 nm of a solution prepared using orthochlorophenol as a solvent (0.8 g/10 ml) is in a range of 0.22 to 0.36.

Effect According to the Invention

According to the present invention, the amount of cyclic trimer can be greatly reduced, and a polyester resin composition the color tone of which is good, which is little in foreign materials and the viscosity of which is suitable for forming by extrusion can be provided. Further, according to the present invention, with a good color tone and substantially without changing an intrinsic viscosity of a raw polymer, only the cyclic compound can be reduced with a good productivity at a low cost. Furthermore, by heat treatment from a low-viscosity condition, while the intrinsic viscosity is maintained at a usual level, a polymer reduced in cyclic compound can be obtained.

The polyester resin composition according to the present invention can be spun, formed into a film and molded without particularly changing usually employed conditions, and further, it becomes possible to prevent contamination of oil at the time of spinning or contamination of casting and stretching machines at the time of film formation ascribed to cyclic trimer. Further, a defect ascribed to precipitation of cyclic compound can be prevented at the time of using a product, and the product such as a film, fibers or a bottle can be used effectively. In particular, it is effective for use of magnetic tapes or optical films, and as a container for food and films for lamination with a steel plate, for wrapping and for electrical insulation.

THE BEST MODE FOR CARRYING OUT THE INVENTION

The polyester resin composition according to the present invention includes first and second polyester resin compositions described later. As the first and second polyester resin compositions described later in the present invention, polyethylene terephthalate, polyethylene isophthalate, polybutylene terephthalate, polypropylene terephthalate, polycyclohexanedimethylene terephthalate, polyethylene naphthalate, etc. can be exemplified, and further, it may be a copolymer thereof. Among these polyesters, polyethylene terephthalate and polyethylene naphthalate are preferred because of good properties as a film, and in particular, polyethylene terephthalate is most preferable. Although polyethylene terephthalate may be copolymerized, it is preferred that not less than 90 mol % of polyester forming unit is a unit of ethylene terephthalate. In a case where the ethylene terephthalate unit is less than 90 mol %, the crystallinity of the polyester deteriorates, and there is a case where it becomes difficult to satisfy the degree of crystallization in the process for producing the polyester resin composition according to the present invention.

As the component copolymerized with these polyesters, a dicarboxylic component, a glycol component and a polyfunctional component can be raised, and for example, as the dicarboxylic component, terephthalic acid, 2,6-naphthalene dicarboxylic acid, diphenyl dicarboxylic acid, phthalic acid, isophthalic acid, sodium sulfoisophthalate, and aromatic dicarboxylic component thereof such as alkylester, adipic acid, sebacic acid and aliphatic dicarboxylic component thereof such as alkylester, 1,4-cyclohexane dicarboxylic acid and aliphatic dicarboxylic component thereof such as alkylester, can be exemplified. As the glycol component, ethylene glycol, diethylene glycol, propylene glycol, butanediol, 1,4-cyclohexane dimethanol, neopentyl glycol, spiro glycol, ethylene oxide adduct of bisphenol A, isosolvate, etc. can be exemplified. Further, as the polyfunctional component, polyfunctional carboxylic acid such as trimellitic acid or pyromellitic acid, and polyfunctional alcohol such as trimethylol propane or pentaerithritol, can be exemplified. Furthermore, hydroxy carboxylic acid such as p-hydroxy benzoic acid may be used as the copolymerized component.

In the first polyester composition according to the present invention, after finishing to polymerize polyester, it is appropriately cut by a method such as sheet cutting or strand cutting, and it is formed a particle-like (chip-like) shape. The shape of the particles (chips) may be arbitrary, but if it is too small and it becomes fine powder-like, it may cause troubles at a heat treatment process or a forming process thereafter. Further, in a case where the shape is large, although it does not particularly cause a problem with respect to the meaning for reducing cyclic compounds, there are problems from the viewpoint of operation. Therefore, the size of polyester composition (particle, chip) is preferably in a range of 1 mm to 50 mm in equivalent spherical diameter, and more preferably in a range of 2 mm to 20 mm. Where, the equivalent spherical diameter means a diameter of sphere having the same volume as that of the polyester composition (particle, chip).

The degree of crystallization of the first polyester composition according to the present invention is preferably not less than 65% and less than 99%, more preferably not less than 70% and less than 95%, and most preferably not less than 75% and less than 90%. In the polyester composition having a degree of crystallization in such a range and having such a shape, the amount of cyclic trimer is remarkably reduced. If less than 65%, the amount of cyclic trimer is hardly reduced similarly to in a usual polyester, and if 99% or more, the productivity is bad. The content of cyclic trimer in the first polyester composition according to the present invention is preferably not more than 0.4% by weight, more preferably not more than 0.3% by weight, and most preferably not more than 0.25% by weight. By such a condition where the amount of cyclic trimer is small, it becomes possible to lengthen the time for forming the polymer until the cyclic trimer is precipitated.

The intrinsic viscosity of the first polyester composition according to the present invention is preferably not more than 0.7 dl/g. If more than 0.7 dl/g, because the viscosity is high, improper extrusion or deterioration of polymer due to exothermic may occur at the time of forming, and nonuniform polymer may be produced. Further, it is necessary to set a resin temperature for forming at a high temperature in order to improve the property for the melt forming, and as the result thereof, a cyclic compound is liable to be generated in a product. Further, as the lower limit, not less than 0.4 dl/g is preferable. In a case where the intrinsic viscosity is lower than 0.4 dl/g, a problem on forming such as yarn cut at the time of spinning, film breakage at the time of film formation or breakage at the time of forming is likely to occur, and therefore, in particular, the composition having an intrinsic viscosity of not less than 0.4 dl/g and not more than 0.7 dl/g is preferably used.

In a case where the first polyester composition according to the present invention is used, for example, as a raw material for forming a film, when a content of alkali metal element is referred to as Ma (mol/t), a content of alkaline earth metal element is referred to as Md (mol/t) and a content of phosphorus element is referred to as Mp (mol/t), it is preferred that Ma, Md and Mp satisfy the following equation.

$$Ma+2\times Md \geqq 3\times Mp$$

The above-described equation has the same meaning as "M−P≧0" if "Ma+2×Md" is referred to as M and "3×Mp" is referred to as P, and preferably, M−P≧0.5 is satisfied. If M−P<0, the property of electrostatic casting becomes bad, air is likely to be involved between a film and a casting drum at the time of melt extruding and casting, a state in which the speed for film formation must be lowered is liable to occur, and reduction of the productivity may be caused. Further, although the reason is not clear, by controlling the amount of elements of the polyester composition in the above-described range, it becomes possible to accelerate the suppression of precipitation of cyclic trimer to the surface and further to decrease the amount of cyclic trimer faster at the time of heat treatment. Although the compound containing alkali metal element and the compound containing alkaline earth metal element for satisfying the above-described equation are not particularly limited, concretely, for example, lithium acetate, sodium acetate, potassium acetate, magnesium acetate, potassium hydroxide, sodium hydroxide, magnesium hydroxide, etc. can be used.

In the first polyester composition according to the present invention, it is preferred that the number density of particles having a maximum diameter of not less than 1 μm and containing an element of Ti, Sb or Ge is less than 10,000 per 1 mg of the polyester composition. More preferably, it is less than 5,000. If this number density is not less than 10,000, when converted into a polyester film, the surface roughness may be enlarged, or the transparency of the film may be damaged.

The first polyester composition according to the present invention preferably contains a trivalent phosphorus compound, and the content thereof is preferably in a range of 1 to 100 ppm relative to the polyester composition as a weight of phosphorus atoms. More preferably, it is in a range of 5 to 50 ppm. If the content is more than 100 ppm, the polymerization reaction property tends to be deteriorated, and if the content is less than 1 ppm, it becomes difficult to maintain the thermal resistance. Where, the content means the amount with respect to phosphorus atoms of trivalent phosphorus compound, and by employing the trivalent phosphorus compound, the thermal resistance is maintained as well as, although the reason is not clear, the reduction speed of cyclic trimer is decreased.

In the first polyester composition according to the present invention, it is preferred that titanium element is contained in a range of 0.5 to 50 ppm as a weight of titanium atoms relative to the polyester composition obtained, because the polymerization activity becomes high and the color tone and thermal resistance of the obtained polymer become good. If the content is more than 50 ppm, the thermal resistance deteriorates, and further, it is likely to become a factor of foreign material ascribed to catalyst. More preferably, the content is in a range of 1 to 20 ppm. In order to contain a predetermined amount of titanium element in the polymer, a predetermined amount of a compound containing the element may be added at the time of addition thereof (the added amount is held in the polymer as it is). Further, it is preferred that the content of the alkali metal element is in a range of 1 to 30 ppm as a weight of alkali metal atoms relative to the polyester composition, and by this, pH in the system at the time of polymerization can be raised, and the hydrolysis of the titanium compound can be suppressed. The content of alkali metal element is preferably in a range of 1 to 15 ppm. If the content is less than 1 ppm, the effect for suppressing the hydrolysis is poor, and if the content is more than 30 ppm, it may cause generation of foreign materials. The introduction of alkali metal element can be realized, for example, by adding a compound such as sodium hydroxide, potassium hydroxide, sodium acetate or potassium acetate at a predetermined amount.

As the above-described compound containing titanium element, a titanium chelate compound or tetraalkoxy titanium compound is preferred. For example, titanium chelates such as titanium acetylacetonate, titanium tetraacetylacetonate, titanium octyleneglycolate, titanium lactate, titanium ethylacetoacetate, titanium citrate, titanium peroxocitrate and titanium ammonium, or alkyltitanate such as tetraisopropyltitanate, tetrabutyltitanate, tetra(2-ethylhexyl)titanate and tetramethyltitanate can be exemplified, and among these, titanium chelate or tetrabutyltitanate is preferably used.

The above-described first polyester composition can be prepared, for example, by heating a polyester having an intrinsic viscosity of not more than 0.55 dl/g and an equivalent spherical diameter of 1 mm to 50 mm at a temperature of a melting point of the polyester composition to a temperature lower than the melting point by 80° C. under a pressure-reduced condition and/or an inert gas flowing condition.

In a case of polyethylene terephthalate, the above-described temperature for heating (heat treatment) is preferably not lower than 190° C. and lower than 260° C., particularly preferably, not lower than 200° C. and lower than 250° C.

Although the intrinsic viscosity of the polyester composition used in the above-described heat treatment is preferably not more than 0.55 dl/g, more preferably polyester with an intrinsic viscosity of not more than 0.5.0 dl/g is used from the viewpoint of cyclic trimer and color tone. The lower limit is not less than 0.35 dl/g. If less than 0.35 dl/g, because the speed for increasing the viscosity at the time of heat treatment is too slow, the productivity is reduced.

In a case where the temperature for heat treatment is lower than 190° C., the speed for reducing the amount of cyclic compound becomes small. In a case of higher than 260° C., the polymer is dissolved, and even if the heat treatment is carried out, the amount of the cyclic compound tends not to be reduced. Therefore, the heat treatment is carried out preferably at a temperature of not higher than the melting point of the polymer (polyester) being heat treated.

The time for heat treatment is usually not less than 2 hours and not more than 60 hours, preferably not less than 3 hours and not more than 40 hours. In a case where the time is shorter than 2 hours, the effect for decreasing cyclic compound is small, and in a case of longer than 60 hours, the speed for decreasing cyclic compound becomes small, and on the contrary, a problem such as thermal deterioration becomes great.

In a case where the polyester composition with an intrinsic viscosity of not more than 0.55, it is important to carry out the heat treatment at a pressure-reduced condition, preferably, at a condition of not higher than 133 Pa, and/or at an inert gas flowing condition. The inert gas may be inert relatively to polyester, for example, nitrogen, helium, carbon dioxide, etc. can be exemplified, and from the economic point, nitrogen is preferably used.

In a case where the inert gas is used, the atmosphere at the time of heat treatment is important. Because oxidative decomposition or hydrolysis is likely to occur in polyester by oxygen and moisture, it is necessary to suppress oxygen and moisture in the atmosphere. The moisture content in the atmosphere is preferably not more than 1,000 ppm, more preferably not more than 500 ppm, and further preferably not more than 400 ppm. If the moisture content in the atmosphere is more than 1,000 ppm, although cyclic compound decreases, at the same time, polyester is hydrolyzed and the intrinsic viscosity of the obtained polymer tends to decrease. On the other hand, it is preferred not to make the moisture content to be 1 ppm or less. Because, in a case where the moisture content is not more than 1 ppm, not only the process becomes complicated in order to increase the purity of the inert gas, but also the speed for decreasing cyclic compound tends to be reduced. Further, the oxygen concentration is not more than 1,000 ppm, preferably not more than 500 ppm, more preferably not more than 100 ppm, most preferably not more than 50 ppm. In a case where the oxygen concentration is more than 1,000 ppm, polyester is likely to be deteriorated.

The apparatus for heat treatment used for the above-described heat treatment is preferably an apparatus capable of heating polyester uniformly. Concretely, a ventilation dryer, a rotary dryer, a fluidized dryer, dryers having various agitators, etc. can be used.

Further, in the present invention, it is preferred to appropriately remove moisture of polyester before carrying out the heat treatment. Furthermore, it is more preferred to crystallize a part of polyester in order to prevent fusion of polymers to each other at the time of heat treatment.

In the present invention, it is preferred to add an antioxidant in order to improve coloring. As the antioxidant, a phenol-group antioxidant, a phosphorus-group antioxidant, an amine-group antioxidant, lactone-group antioxidant, etc. are suitable.

As the phenol-group antioxidant, a compound can be used as long as it has a phenol structure and has at least one bulky group in the phenol ring. Concretely, a compound having the following structure is preferable.

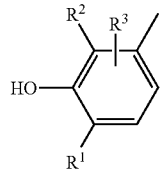

[Chemical formula 1]

Where, $R^1$, $R^2$: alkyl group, substitutional alkyl group, or substitutional triazole group (respective groups may be same or may be different from each other.)

$R^3$: alkyl group, substitutional alkyl group, alkoxy group, or substitutional amino group.

As examples of such a compound, there are 2,2'-methylenebis(4-methyl-6-tert-butylphenol), 1,6-hexanediolbis[3-(3,5-di-tert-butyl-4-hydroxyphenyl)propionate], pentaerythritoltetrakis[3,5-di-tert-butyl-4-hydroxyphenyl)propionate], distearyl-3,5-di-tert-butyl-4-hydroxybenzylphosphonate, 2,6,7-trioxa-1-phosphabicyclo[2,2,2]octa-4-illmethyl3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di-tert-butylphenol), 3,5-di-tert-butyl-4-hydroxybenzyldiamine, N,N'-hexamethylenebis-3,5-di-tert-butyl-4-hydroxyhidrocinnamide, etc. In particular, diethyl [[3,5-bis(1,1-dimethylethyl)-4-hydroxyphenul]methyl] phosphonate is preferable because of its excellent effect. This compound is sold on the market, for example, as "IRGANOX 1222" by Ciba Specialty Chemicals Holding Inc.

As the phosphorus-group antioxidant, a compound containing a trivalent phosphorus and having at least one bulky group in the benzene ring is preferable. Concretely, a compound having the following structure is preferable.

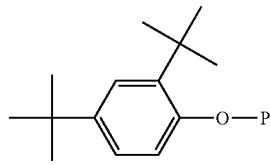

[Chemical formula 2]

As examples of such a compound, there are bis[2,4-bis(1,1-dimethylethyl)-6-methylphenyl]ethylester phosphite, tetrakis(2,4-di-tert-butylphenyl)[1,1-biphenyl]-4,4'-diillbis-phosphonite, bis(2,4-di-tert-butylphenyl)pentaerythritol-diphosphite, bis(2,6-di-tert-butyl-4-methylphenyl)pentaerythritol-diphosphite, 2-[[2,4,8,10-tetrakis(1,1-dimethylethyl)dibenzo[d,f][1,3,2]dioxaphosphepine-6-yl]oxy]-, N,N-bis[2-[[2,4,8,10-tetrakis(1,1-dimethylethyl)dibenzo[d,f][1,3,2]dioxaphosphepine-6-yl]oxy]-ethyl]ethaneamine, etc. These are sold on the market, for example, as "IRGAFOS126", etc. by Ciba Specialty Chemicals Holding Inc.

As the amine-group antioxidant, for example, a compound having the following structure is preferable.

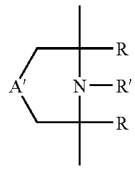

[Chemical formula 3]

Where,
R: alkyl group (may be same or may be different from each other)
R': hydrogen or alkyl group
A': two or three-member alkylene ring (unsaturated or saturated)

A derivative of 2,2,6,6-tetramethylpiperidine is preferable. For example, there are 4-acetoxy-2,2,6,6-tetramethylpiperidine, 4-stearoyloxy-2,2,6,6-tetramethylpiperidine, 4-aryloyloxy-2,2,6,6-tetramethylpiperidine, 4-metoxy-2,2,6,6-tetramethylpiperidine, 4-benzoiloxy-2,2,6,6-tetramethylpiperidine, 4-cyclohexyloxy-2,2,6,6-tetramethylpiperidine, 4-phenoxy-2,2,6,6-tetramethylpiperidine, 4-benzoxy-2,2,6,6-tetramethylpiperidine, 4-(phenylcarbamoyloxy)-2,2,6,6-tetramethylpiperidine, etc. These are sold on the market, for example, as "FS042", etc. by Ciba Specialty Chemicals Holding Inc.

Further, the lactone-group antioxidant is also preferable, and for example, 5,7-di-tert-butyl-3-(3,4-dimethylphenyl)-3H-benzofuran-2-one is preferable.

These may be used individually or may be used as a mixture, and the amount used is in a range of 0.0001 to 1% by weight relative to the weight of polyester composition, preferably in a range of 0.001 to 0.1% by weight. By adding the antioxidant to the polyester composition in addition to be able to suppress the influence of oxygen involved at the time of heat treatment, the thermal resistance is increased and the deterioration of color tone can be improved although the reason is not clear.

It is preferred that the intrinsic viscosity of the polyester composition containing the antioxidant is 0.4 dl/g or more. If the intrinsic viscosity is lower than 0.4 dl/g, a problem in forming such as yarn cut at the time of spinning, film breakage at the time of film formation or breakage at the time of molding is liable to occur, and if the intrinsic viscosity is too high, the temperature is raised at the time of forming by the exothermic due to the shear of molten resin, or it is necessary to set a resin temperature for forming at a high temperature in order to improve the property for the melt forming, and as the result thereof, a cyclic compound is liable to be generated in a product. In particular, a polyester composition having an intrinsic viscosity of not less than 0.45 dl/g and not more than 0.90 dl/g is preferably used.

In a case where the above-described antioxidant is used for the polyester composition, it is preferred that for the heat treatment the following condition, which does not change the intrinsic viscosity, is employed.

For example, in order to obtain a polyester composition with a constant quality, it is important to carry out the heat treatment in an atmosphere with a degree of flowing of inert gas of 1 liter/hr or less per 1 kg of polyester composition. Although depending upon the heating temperature, for example, in a case where the heating temperature is not lower than 220° C., the degree of flowing (flow rate) is more preferably not more than 0.5 liter/hr. Further preferably, it is not more than 0.1 litter/hr, and it may be a resident state which causes almost no flow. If the flow rate is more than 1 liter/hr per 1 kg of polyester composition, the intrinsic viscosity of the polymer increases, and it becomes difficult to industrially obtain a polyester composition with a constant quality.

The heat treatment is preferably carried out at a temperature in a range of "a melting point of the used polyester composition" to "a temperature lower than the melting point by 80° C.". In a case of a usual polyethylene terephthalate, the temperature is preferably not lower than 190° C. and not higher than 260° C., and particularly preferably not lower than 200° C. and not higher than 250° C. In a case where the temperature for heat treatment is lower than 190° C., the reduction speed of cyclic compound is liable to become small. Further, in a case of higher than 260° C., the polymer is molten, and even if the heat treatment is carried out, cyclic compound tends not to be decreased. Therefore, it is important to carry out the heat treatment at a temperature of not higher than the melting point of the polyester composition.

The time for the heat treatment is usually not less than 2 hours and not more than 60 hours, preferably not less than 3 hours and not more than 40 hours. In a case where the time is shorter than 2 hours, the effect for decreasing cyclic compound is small, and in a case of longer than 60 hours, the speed for decreasing cyclic compound becomes small, and on the contrary, a problem such as thermal deterioration becomes great.

The inert gas in the present invention may be inert relatively to polyester, for example, nitrogen, helium, carbon dioxide, etc. can be exemplified, and from the economic point, nitrogen is preferably used.

Because oxidative decomposition or hydrolysis is likely to occur in polyester by oxygen and moisture, it is important to control the oxygen and the moisture in the inert gas atmosphere. The moisture content in the atmosphere is preferably not more than 1,000 ppm (by weight, hereinafter, in the present invention, "ppm" is defined by weight), more preferably not more than 500 ppm, and further preferably not more than 400 ppm. If the moisture content in the atmosphere is more than 1,000 ppm, although cyclic compound decreases, at the same time, polyester is hydrolyzed and the intrinsic viscosity of the obtained polymer tends to decrease. Further, it is preferred not to make the moisture content to be 1 ppm or less. Because, in a case where the moisture content is not more than 1 ppm, not only the process becomes complicated in order to increase the purity of the inert gas, but also the speed for decreasing cyclic compound tends to be reduced. Further, the oxygen concentration is not more than 1,000 ppm, preferably not more than 500 ppm, more preferably not more than 100 ppm, most preferably not more than 50 ppm. In a case where the oxygen concentration is more than 1,000 ppm, polyester is likely to be deteriorated.

Further, in the heat treatment, it is preferred to heat the polyester at a condition, for example, where the inside of a heating bath is slightly pressurized by the aforementioned inert gas. The pressure of the atmosphere at the time of the heat treatment is controlled preferably at $1.03\text{-}4.9 \times 10^5$ Pa, more preferably at $1.07\text{-}1.96 \times 10^5$ Pa. In a case where the atmosphere pressure is less than $1.03 \times 10^5$ Pa, accompanying with movement of the polyester composition, oxygen and moisture in atmospheric air are likely to enter, and it may cause a reduction of intrinsic viscosity or may cause decomposition by oxidation or hydrolysis. Further, if more than $4.9 \times 10^5$ Pa, the apparatus becomes expensive.

Next, the second polyester composition will be explained.

In the second polyester composition according to the present invention, the content of cyclic trimer is in a range of 0.1 to 0.7% by weight. In a case where the content of cyclic trimer is more than 0.7% by weight, the cyclic trimer is likely to be precipitated on the surface of a film, etc., and the substances precipitated become a surface defect. Further, the content of cyclic trimer is preferably not more than 0.6% by weight from the viewpoint of suppressing the precipitation, more preferably not more than 0.4% by weight.

On the other hand, in a case where the content of cyclic trimer is less than 0.1% by weight, the time for heat treatment required for decreasing the cyclic trimer becomes long, and the thermal stability of the polyester tends to be damaged. Further, in a case where the content of cyclic trimer is less than 0.1% by weight, a remarkable advantage by the cyclic trimer is not particularly exhibited.

Because a cyclic trimer cannot be present in the crystallized part of polyester, if the crystallization of polyester progresses in a process for forming a film, it is unevenly present into the amorphous part. The cyclic trimer present locally in the amorphous part at a high concentration is in a condition easy to be precipitated to the surface of the polyester, and when the amount of the cyclic trimer becomes more than about 1.2% by weight, it is precipitated. Therefore, when the degree of crystallization of polyester is referred to as c % (% by volume), it is preferred that the content of cyclic trimer (% by weight) is smaller than $1.2 \times ((100-c)/100)$. In a case of a film having a degree of crystallization of 50%, the content of cyclic trimer is preferably smaller than 0.6% by weight.

In the second polyester composition according to the present invention, the content of carboxylic end group is in a range of 15 to 40 equivalent/ton. If less than 15 equivalent/ton, a film is likely to slip in a process of film formation by reduction of a property for close contact between a stretching roller and the film, and the scratches are likely to be generated on the film surface, or the adhesive property of the film becomes poor at the time of processing the film surface. On the other hand, if more than 40 equivalent/ton, the color tone of the polyester resin or the film becomes yellowish, and it becomes difficult to employ them for an optical use. The content is more preferably in a range of 15 to 35 equivalent/ton, and most preferably in a range of 18 to 30 equivalent/ton.

In the polyester composition according to the present invention, the intrinsic viscosity is in a range of 0.55 to 0.80. In the present invention, the intrinsic viscosity is a viscosity determined at 25° C. using orthochlorophenol as a solvent, if less than 0.55, it causes insufficient mechanical properties as a formed product, and if more than 0.8, exothermic due to shear at the time of extrusion becomes remarkable and thermal decomposition of the polymer may be induced. It is preferably in a range of 0.55 to 0.75, and most preferably in a range of 0.6 to 0.7.

In the second polyester composition according to the present invention, an absorbance at a wavelength of 365 nm of a solution prepared by dissolving 0.8 g of the composition in 10 ml of orthochlorophenol is in a range of 0.22 to 0.36. 365 nm light is a blue light, and when this light is much absorbed, the polymer becomes yellowish. In a case where the absorbance is more than 0.36, it becomes difficult to use the polyester composition or film for optical field. On the other hand, in order to achieve the absorbance at a value less than 0.22, it is necessary to sacrifice the productivity such as reducing the amount of charged raw material in the melting and polymerization of polyester, and it is preferred to avoid this from the viewpoint of the balance between cost and quality. The absorbance is preferably in a range of 0.24 to 0.30.

In the second polyester composition according to the present invention, it is preferred that the content of bis(hydroxyethyl)terephthalate is in a range of 50 to 200 ppm (hereinafter, unless not particularly described clearly, "ppm" means a value determined by weight). Although bis(hydroxyethyl)terephthalate is a kind of linear oligomer of polyethylene terephthalate, in a case where the content of the oligomer is more than 50 ppm, the forming property of polyester is preferably improved, and on the other hand, in a case of more than 200 ppm, the oligomer is sublimated in a processing process for forming polyester, and it frequently contaminates an apparatus and a product.

In the second polyester composition according to the present invention, although the polymerization catalyst is not particularly limited, it is preferred that antimony element is controlled in a range of 30 to 150 ppm and alkaline earth element is controlled in a range of 1 to 80 ppm. If antimony element is less than 30 ppm, it becomes difficult to decrease cyclic trimer, and if more than 150 ppm, the cyclic trimer once decreased is likely to be regenerated at the time of melting polyester. If alkaline earth element is less than 1 ppm, because the volume specific resistance at melting of polyester resin becomes high, it becomes difficult to apply an electrostatic casting to a process for making a film, and if more than 80 ppm, the cyclic trimer once decreased is likely to be regenerated at the time of melting polyester.

In a case where the above-described antimony element is not used or it is controlled to be less than 30 ppm, it is preferred to use a titanium element compound as the polymerization catalyst. In this case, it is preferred to control titanium element in a range of 0.5 to 50 ppm. If titanium element is less than 0.5 ppm, it becomes difficult to decrease cyclic trimer, and if more than 50 ppm, the cyclic trimer once decreased is likely to be regenerated at the time of melting polyester. As another catalyst, a germanium compound also can be used.

As the antimony compound, antimony trioxide can be preferably used. In a case of titanium catalyst, titanium chelate compound or tetraalkoxy titanium compound can be preferably used. For example, titanium chelate such as titanium acetylacetonate, titanium tetraacetylacetonate, titanium octyleneglycolate, titanium lactate, titanium ethylacetoacetate, titanium citrate, titanium peroxocitrate and titanium ammonium, or alkyltitanate such as tetraisopropyltitanate, tetrabutyltitanate, tetra(2-ethylhexyl)titanate and tetramethyltitanate can be exemplified, and among these, titanium chelate or tetrabutyltitanate is preferably used.

In the second polyester composition according to the present invention, it is preferred that the degree of crystallization is in a range of 50 to 95% (by volume), and the bulk density is in a range of 0.5 to 1.0 kg/liter. In a case of high degree of crystallization, cyclic trimer can be decreased more efficiently. In a case where the degree of crystallization is less than 50%, it becomes difficult to decrease the content of cyclic trimer. Further, in order to achieve the degree of crystallization at a value more than 95%, it is necessary to heat polyester chips for a long time, and it is liable to induce a thermal deterioration of polyester resin. In a case where the bulk density of the polyester resin chips is less than 0.5 kg/liter, inconvenience is likely to be caused in transportation or handling of chips, and in a case of more than 1.0 kg/liter, because cyclic trimer in the chips is decreased, the chips are liable to be colored when heat treated.

The process for obtaining the above-described second polyester composition will be shown hereunder.

In a first process for producing the second polyester composition according to the present invention, a polyester having an intrinsic viscosity of 0.4 to 0.7 and a degree of crystallization of not less than 30% is heated at a temperature of 190° C. to 250° C. for 0.5 to 60 hours under an inert gas atmosphere having a pressure of 650 to 1,020 hPa.

For the inert gas atmosphere, for example, noble gas such as helium, neon, argon, etc. and nitrogen gas or carbon dioxide gas can be employed. Among these, nitrogen gas can be easily gotten, and it can be preferably used. It is preferred that the concentration of oxygen or moisture is controlled to be not more than 500 ppm by volume. In a case where the concentration of oxygen or moisture is more than 500 ppm, the polyester is likely to be deteriorated, and it may cause coloring of the polyester.

The pressure of the inert gas atmosphere is controlled in a range of 650 to 1,020 hPa. In a case of less than 650 hPa, because solid-phase polymerization progresses, the degree of polymerization of the polyester increases. The increase of the polymerization degree causes increase of melt viscosity of the polyester resin, exothermic due to shear at the time of melt forming the resin becomes violent, and deterioration of the polyester resin is liable to occur. Further, in a case of less than 650 hPa, the content of bis(hydroxyethyl)teraphthalate is likely to be decreased, and the forming property of the polyester resin is also likely to become bad. On the other hand, in a case where the pressure of the inert gas atmosphere is more than 1,020 hPa, thermal decomposition of polyester is likely to occur. In a case being treated at a pressurized condition, as described later, it is important to flow the inert gas atmosphere at a specified flowing degree. The pressure is preferably in a range of 800 to 1,020 hPa, more preferably in a range of 850 to 1,000 hPa.

The intrinsic viscosity of the polyester carried out with heat treatment is in a range of 0.4 to 0.7. If lower than 0.4, although cyclic trimer is liable to be decreased, a polyester formed product obtained becomes poor in mechanical properties. In a case where the intrinsic viscosity is higher than 0.7, the speed for decreasing cyclic trimer is slow, a long-time heat treatment becomes necessary, and it is economically disadvantageous. The intrinsic viscosity is preferably in a range of 0.5 to 0.7, more preferably in a range of 0.55 to 0.68. A polyester resin having an intrinsic viscosity in such a range can be obtained by controlling polymerization agitating torque in a usual melt polymerization.

In the polyester resin to be carried out with heat treatment, the degree of crystallization is not less than 30%. Because cyclic trimer exists in the amorphous part of the polyester resin, when the crystallization progresses, the cyclic trimer is concentrated into the amorphous part. In the polyester with such a condition, because the cyclic trimer having been supersaturated in the amorphous part is decreased down to an equilibrium amount, the amount of cyclic trimer as the whole of the polyester resin can be decreased. In a case where the degree of crystallization is less than 30%, because the degree of supersaturation of cyclic trimer in the amorphous part is insufficient, a great effect for decreasing the cyclic trimer cannot be expected. Where, the degree of crystallization can be increased even during heat treatment, it is preferred to finally achieve a degree of crystallization of not less than 70%. In the process for achieving a degree of crystallization of not less than 30%, it is preferred to provide a process for crystallization treatment before the heat treatment, and for example, it is preferred to heat the polyester resin at 120 to 180° C. for a time of 2 hours or more under a pressure-reduced condition and a condition being flowed with hot air. This process may be set together with a drying process. The degree of crystallization of polyester resin can be confirmed by change of density, and for example, when the density of the completely amorphous part is referred to as 1.335 g/cm$^3$ and the density of the crystallized part is referred to as 1.455 g/cm$^3$, it is determined by the following equation.

Degree of crystallization=(chip density−1.335)/ (1.455−1.335)

The temperature for carrying out the heat treatment is in a range of 190° C. to 250° C. If lower than 190° C., because the speed for decreasing oligomer is low, the time for the treatment becomes long and it is disadvantageous economically, and if the treatment temperature is higher than 250° C., fusion of the polyester resin is likely to occur, and because thermal deterioration also occurs, the coloring of polyester becomes violent. The temperature is preferably in a range of 200° C. to 240° C., more preferably in a range of 220° C. to 235° C.

The time for the heat treatment is in a range of 0.5 to 60 hours. Although the time varies depending on the residual amount of polymerization catalyst and the treatment temperature, if less than 0.5 hour, it is difficult to sufficiently decrease cyclic trimer, and if more than 60 hours, it becomes economically disadvantageous. Although only cyclic trimer can be decreased without increasing the degree of polymerization of polyester and without coloring by the above-described process, the production may be carried out by the following second process.

In the second process for producing a polyester resin composition, a polyester having an intrinsic viscosity of 0.4 to 0.7 and a degree of crystallization of not less than 30% is heated at a temperature of 190° C. to 250° C. for 0.5 to 60 hours, while an inert gas at a pressure of 1,020 hPa to 0.5 MPa is flowed at not less than 1 liter/hr per 1 kg of the polyester.

The intrinsic viscosity, degree of crystallization, treatment temperature and time are similar to those in the first process, but in this second process, the treatment is carried out while the inert gas at a pressure of 1,020 hPa to 0.5 MPa is flowed at not less than 1 liter/hr per 1 kg of the polyester. As the inert gas, a gas similar to that in the first process can be chosen, and the concentration of oxygen and the concentration of moisture are also controlled preferably in ranges similar to those in the first process. Where, the flowing amount of inert gas in the present invention means an amount at a standard condition, and the standard condition means a condition at a pressure of 1,013 hPa and a temperature of 0° C.

In a case where the pressure of inert gas is lower than 1,020 hPa, because solid-phase polymerization progresses if the inert gas flows, the degree of polymerization of the polyester resin increases. On the other hand, even if the pressure is controlled at a high pressure more than 0.5 MPa, it is not particularly effective for decreasing oligomer, and it is economically disadvantageous. The pressure is preferably in a range of 0.12 MPa to 0.4 MPa, and more preferably in a range of 0.15 MPa to 0.35 MPa. By flowing the inert gas at a pressurized condition, thermally deteriorated substances such as acetoaldehyde generated from polyester is discharged to outside of the system, and because ethylene glycol and the like is hard to be discharged at a pressurized condition, increase of polymerization degree can be suppressed while coloring is suppressed, and cyclic trimer can be decreased. This advantage is exhibited by the fact in that, although the vapor pressure of acetoaldehyde at the temperature of the heat treatment exceeds 0.5 MPa, the vapor pressure of ethylene glycol is not more than 0.5 MPa.

The third production process is a process for replacing an atmosphere for heat treatment intermittently.

Concretely, it is a process wherein a process (A) for heat treating a polyester at a temperature of 190° C. to 250° C. for 15 minutes to 10 hours under a condition of an inert gas atmosphere having a degree of flow of inert gas of not more than 1 liter/hr per 1 kg of the polyester and a process (B) for renewing the inert gas atmosphere by replacing the inert gas atmosphere within 15 minutes are repeated alternately, and the total time of the processes (A) and (B) is set at 0.5 to 60 hours. Because the inert gas atmosphere almost does not move in the process (A), the intrinsic viscosity of the polyester composition during the heat treatment almost does not change. On the other hand, a fine amount of by-product such as acetoaldehyde generated in the process (A) is discharged out of the apparatus by the process (B), and it is prevented that the polyester composition is colored or deteriorated.

In the process (B), a method for filling the heat treatment apparatus with a new inert gas wherein after once making the inside of the heat treatment apparatus a vacuum condition, a method for replacing the inert gas by flowing the inert gas at a volume more than the volume of the treatment bath, etc. can be employed. It is preferred to complete the process (B) within 15 minutes, and if more than 15 minutes, there is a case where the intrinsic viscosity of the polyester composition increases.

After the atmosphere for heat treatment is renewed by the process (B), the condition may be transferred to the condition of the process (A) as it is and the process (A) may be carried out.

In the first, second and third production processes according to the present invention, in a case where a heating bath for heating polyester is used, it is preferred that the capacity of the heating bath (capacity of the interior of the bath) is set at not less than 150% of an apparent volume of the polyester resin. If the capacity of the bath is less than 150%, the polyester is likely to be colored by the heat treatment.

For example, in a case where the capacity of the bath is 150 liters, if polyester resin with an apparent specific gravity of 0.7 is deposited into the bath, the apparent volume of the polyester resin becomes a value corresponding to 100 liters, and the capacity of the bath becomes 150%. The capacity of the bath is more preferably 200% or more, and most preferably 250% or more. On the other hand, if more than 500%, such a capacity of bath reduces the productivity, and a particular advantage for color tone of polyester cannot be expected by such a capacity.

As the heat treatment apparatus used for the above-described heat treatment, an apparatus capable of heating polyester uniformly is preferable. Concretely, a ventilation dryer, a rotary dryer, a fluidized dryer, dryers having various agitators, continuous tower dryer, etc. can be used.

The polyester film prepared from the polyester resin composition according to the present invention is suitable for a magnetic recording medium, or films for optical field, for being laminated with a steel plate and for wrapping, because cyclic trimer is hard to be precipitated to the film surface even in a case of a long-term storage and further cyclic trimer is hard to be precipitated to the film surface even if the film is treated at a heating condition. In a case where it is wished to suppress the precipitation of cyclic trimer only on a specified surface of a film, a formation of a laminated film can also be employed. If the polyester resin according to the present invention is laminated, the precipitation of cyclic trimer can be suppressed not only on the laminated surface but also a surface which is not laminated. In a case of lamination, it is preferred that at least one surface contains the above-described polyester resin composition according to the present invention.

Next, the process for producing the first and second polyester compositions according to the present invention will be explained raising examples.

Polyethylene terephthalate can be produced, for example, by any of the following processes. Namely, they are (1) a process for using terephthalic acid and ethylene glycol as raw materials, preparing a low-molecular polymer by direct esterification and preparing a high-molecular polymer by successive condensation polymerization, and (2) a process for using dimethylterephthalate and ethylene glycol as raw materials, preparing a low-molecular polymer by transesterification and preparing a high-molecular polymer by successive condensation polymerization. In the present invention, any of processes (1) and (2) can be employed. Further, as needed, an antioxidant, an antiblocking agent, etc. can be added before reaction or during reaction.

In the present invention, a process can be employed for adding an antioxidant at an arbitrary stage in the reaction of the process (1) or (2), carrying out condensation polymerization and preparing a high-molecular polyethylene terephthalate.

Further, although the above-described reaction is carried out by a batch process, a semi-batch process or a continuous process, the production process according to the present invention can be adapted to any type process of the processes. Further, the antioxidant may be added by kneading it after completing polymerization.

The intrinsic viscosity of the polyester resin can be determined by an agitating torque at a finishing point of polymerization. In a case of a high agitating torque, the melt viscosity of the polymer is high, and the intrinsic viscosity also becomes high. The agitating torque for determining the finishing point of a polymerization apparatus may be set so as to achieve an aimed intrinsic viscosity.

The polyester resin prepared and finished in polymerization may be discharged from a lower portion of the polymerization apparatus in a form of strand, and it may be cut by a cutter while being cooled by water. Because the shape of chips can be controlled by cutting, polyester chips having a desirable bulk density for the present invention can be obtained.

It is preferred that the polyester resin obtained is dried before heat treatment. The drying may be carried out by heating the chips at 120° C. to 180° C. for a time of not less than 2 hours under a pressure-reduced condition or a hot air flowing condition. By such a drying process, the degree of crystallization of the polyester resin can be increased up to a value of not less than 30%.

The polyester resin completed with the drying is successively served to heat treatment, and the polyester resin completed with the heat treatment is cooled and taken out from the bath.

The above-described polyester composition can be suitably used as a film. In particular, it is preferred to make a laminated film having a main layer and a sub layer. The laminated film can be produced, for example, by melting polyesters (A) and (B), respectively. In this case, the melting temperatures are not particularly limited, and temperatures having no inconvenience for extruding the polyesters (A) and (B) from dies may be employed. Then, the molten polyesters (A) and (B) are laminated to each other to form a laminated sheet. As the method for lamination, although any of a method, a so-called coextrusion method, for joining and lamination the polyesters (A) and (B) between extruders and a die or in a die, and discharging it from the die as a laminated sheet, and a method for discharging the polyesters (A) and (B), respectively, in sheet forms from different dies each having a slit, and laminating both sheets, may be employed, the coextrusion method is preferred. Where, although the laminated sheet may have at least laminated layers of polyesters (A) and (B), a two-layer structure of (A)/(B) and a three-layer structure of (A)/(B)/(A) or (B)/(A)/(B) can be employed. In particular, a three-layer structure is preferable. At that time, the film may be formed by only the polyester according to the present invention, or a process for mixing the polyester composition according to the present invention into another polyester composition at a content of not less than 1% by weight and preparing a film changed with a metal concentration is also preferred from the viewpoint of the productivity of other type films or thermal resistance.

For the coextrusion method for lamination, a feedblock, a static mixer, a multimanifold die, etc. can be used. Although a pipe mixer, a square mixer, etc. can be exemplified as the static mixer, a square mixer is preferable in the present invention. Further, it is preferred that a layer comprising the polyester resin composition according to the present invention forms at least one surface from the viewpoint of foreign materials.

The laminated sheet thus obtained is drawn by one of various kinds of movable cooling bodies, preferably, a rotating drum, and at the same time, electrostatic charge is applied to the sheet, and the sheet is cooled and solidified by the movable cooling body. The method for applying electrostatic charge to the sheet is not particularly limited. For example, a method for providing a wire electrode near a position between a die and the movable cooling body and at a position above the sheet surface on the side which does not come into contact with the movable cooling body, and applying a voltage between the wire electrode and the movable cooling body, etc. can be employed. The cooled and solidified laminated sheet, that is, a non-stretched sheet, is then stretched uniaxially or biaxially by one of various stretching processes, for example, a roller stretching process or a tenter stretching process, and this is wound. The order of stretching may be either sequential or simultaneous.

Here, the stretching in the longitudinal direction means a stretching for giving a molecular orientation in the longitudinal direction to the film, for example, it is carried out by circumferential speed difference between rollers. This stretching may be carried out at a single stage, and further, may be carried out at multi stages using a plurality of pairs of rollers. The draw ratio of the stretching is preferably in a range of 2 to 15 times, more preferably in a range of 2.5 to 7 times.

The stretching in the transverse direction means a stretching for giving an orientation in the transverse direction to the film, for example, it is carried out by using a tenter, and stretching the film in the transverse direction by conveying the film at a condition where both sides of the film are grasped by clips. The draw ratio of the stretching is preferably in a range of 2 to 10 times.

In a case of simultaneous biaxial stretching, while the film is conveyed in a tenter while both sides of the film are grasped by clips, the film is stretched simultaneously in the longitudinal and transverse directions, and this process may be employed.

The film thus biaxially stretched is preferably heat treated in the tenter at a temperature of not lower than the stretching temperature and not higher than the melting point in order to give a dimensional stability, and the film is gradually cooled uniformly to a room temperature, and then wound. In the present invention, the temperature for the heat treatment is preferably in a range of 120 to 240° C. from the viewpoints of flatness, dimensional stability, etc.

Although the thickness of the laminated polyester film according to the present invention is not particularly limited, it is preferably in a range of 0.5 to 100 μm, in particular, more preferably in a range of 1 to 80 μm.

Further, in a case where a layer such as an easy adhesion layer or a layer containing particles is formed, using a coating technology such as gravure coating or metering bar type coating, a coating component may be applied at an in-line condition before stretching or between the longitudinal stretching and the transverse stretching, and an off-line coating after stretching may be employed.

The polyester composition and polyester film according to the present invention are effective particularly for use for magnetic recording media such as magnetic tapes, for use for optical base materials such as optical films, or for use for being laminated with a steel plate.

EXAMPLES

Hereinafter, the present invention will be explained in more detail by examples.

The first polyester composition is shown as follows.

(1) Determination of Cyclic Trimer in Polyester:

10 mg of polyester was dissolved in 1 ml of 1,1,2,2-tetrachloroethane by heating at 200° C. for 10 minutes in a glass ampoule, after cooling, the content was diluted by chloroform up to 25 ml, and the obtained solution was analyzed referring to chloroform as a developing solvent by using a high-speed liquid chromatograph HLC-802UR produced by Toyo Soda Corporation.

(2) Intrinsic Viscosity:

It was determined at 25° C. using orthochlorophenol.

(3) Color Tone of Polymer:

It was determined using a color-difference meter produced by Suga Tester Corporation (SM color computer, type SM-3), at L, a and b hunter values.

(4) Concentration of Carboxylic End Group:

A polymer was dissolved in orthocresol/chloroform (weight ratio: 7/3) at 90 to 100° C., and the concentration was determined by measuring an electric potential difference by alkali.

(5) Forcible Oligomer Precipitation Test:

After a film having a square shape with vertical and transverse sizes of 5 cm was heated in an atmospheric air at 150° C. for 30 minutes, it was deposited with Al, it was observed by a differential interference microscope at a magnification of 200 times, and an amount of precipitation of cyclic trimer with a size of not less than 1 μm per 1 mm$^2$ was counted.

(6) Degree of Crystallization:

A density d was determined at 25° C., using a density gradient tube comprising a sodium bromide aqueous solution. From the obtained value, the degree of crystallization was calculated using the following equation.

$$\text{Degree of crystallization}(\%) = (d - 1.335)/(1.455 - 1.335) \times 100$$

(7) Number of Large Foreign Matters in Polyester Composition (Number/Mg) (Number Density of Particles Containing Ti, Sb and Ge Elements):

After chips were cleaned by ultrasonic washing with (concentrated hydrochloric acid:purified water=1:1) for one minute in a clean room of class 100, they were cleaned by ultrasonic washing with purified water for one minute, thereafter, they were dissolved on a cover glass of a hot plate, a sample was made by placing a cover glass thereon so as not to involve air bubbles, it was measured at 4 fields of view by dark field method (magnification: 450 times) using a digital microscope produced by Keyence Corporation (VHZ-450), and it was observed as average value. Cut lines were defined on the polymer thin film on a preparation by a sharp razor at 10 lines×10 rows to make totally 100 of measures. A defect having a maximum diameter of not less than 1 μm was determined as a foreign matter. Foreign matters in 0.02 g of chip were determined from a field of view of 0.0034 cm and a thickness of 40 μm. Further, the preparation was carbon deposited after the polymer thin film portion was served to plasma ash treatment, measures, in which particles counted as not less than 1 μm by an optical microscope existed, were observed by SEM-XMA, and presence of Ti, Ge and Sb elements contained in the particles was confirmed. Thus, a value obtained by converting the number of particles containing Ti, Ge and Sb elements with a size of not less than 1 μm into a value per 1 mg of polymer was defined as the particle number density. Where, the maximum diameter is referred to as a maximum length of an observed defect.

(8) Content of Alkali Metal Such as Lithium in Polyester (Atomic Absorption Method):

It was determined by atomic absorption method using a polarizing-type Zeeman atomic absorption photometer produced by Hitachi Co., Ltd., type: 180-80 (frame: acetylene-air). 8 g of polymer was atomized by frame system using a hollow cathode ray lamp as a light source, rays were detected at the ray measuring part, and the measured value was converted into the content of metal using a calibration curve prepared in advance.

(9) Content of Metal Such as Titanium Element, Antimony Element and Germanium Element in Polyethylene Terephthalate:

It was determined by fluorescent X-ray spectrometer (produced by Horiba Seisakusho Corporation, type MESE-500W) or ICP emission spectrometer (produced by Seiko instruments Corporation, SPS1700). Where, as needed, in order to remove influence due to inorganic particles such as titanium oxide particles in the objective polyethylene terephthalate, fluorescent X-ray spectroscopy or ICP emission spectroscopy was carried out after the following pretreatment. Namely, polyethylene terephtalate was dissolved in orthochlorophenol, and after the viscosity of the polymer solution was adjusted by chloroform as needed, the particles were settled by a centrifugal separator. Thereafter, only the supernatant liquid was recovered by gradient method, polymer was re-precipitated by adding acetone, filtrated and washed to prepare polymer removed with particles. With respect to such a polymer prepared by removing particles by the pretreatment, the amount of metal such as titanium element, antimony element and germanium element was determined.

(10) Equivalent Spherical Diameter:

Here, the equivalent spherical diameter means a diameter of a sphere having the same volume as that of polyester composition (particle, chip), the volume was determined by dividing the weight of polyester composition with a complete amorphous density of the polyester composition ($d_0=1.335$ g/cm$^3$), and the diameter of the sphere was determined therefrom.

Reference Example

Process for Synthesizing Titanium Lactate Sodium Chelate Compound

Lactic acid (226.8 g, 2.52 mol) was dissolved in hot water (371 g) in a flask of 3 L having an agitator, a condenser and a thermometer. Titanium tetraisopropoxide (285 g, 1.00 mol) was slowly added to this solution being agitated, from a drop funnel. This mixture was heated and circulated for one hour to prepare a cloud solution, and by this, isopropanol/water mixture was distilled under a pressure-reduced condition. The product was cooled down to a temperature lower than 70° C., and then, aqueous solution containing NaOH (380 g, 3.04 mol) at 32% by weight was slowly added to this solution being agitated, from a drop funnel. The obtained product was filtered, then mixed with ethylene glycol (504 g, 8 mol), thereafter heated under a pressure-reduced condition to remove isopropanol/water, and a slightly cloud light yellow product (Ti content: 5.6% by weight) was obtained (titanium lactate sodium chelate compound).

Example 1

A slurry of 100 kg of high-purity terephthalic acid (produced by Mitsui Chemical Corporation) and 45 kg of ethylene glycol (Japan Catalyst Corporation) was supplied to an esterification bath, which was charged with about 123 kg of bis(hydroxyethyl)terephthalate beforehand and which was kept at a temperature of 250° C. and a pressure of 1.2×10$^5$ Pa, in order for 4 hours, and even after completion of the supply, esterification was further carried out for one hour, 123 kg of this esterified product was transferred to a condensation polymerization bath.

Successively, to the above-described condensation polymerization bath transferred with the esterified product, titanium lactate sodium chelate was added by 10 ppm at a content converted into a weight of titanium atoms, thereafter, phosphoric group antioxidant "PEP45" (registered trade mark) was added at 100 ppm relative to polymer, magnesium acetate solution was added by 70 ppm at a weight of magnesium atoms, phosphoric acid as a phosphoric compound was added by 10 ppm at a weight of phosphorus atoms, and thereafter, while agitating the low molecular polymer at 30 rpm, the reaction system was gradually heated from 250° C. to 285° C. and the pressure was reduced down to 40 Pa. The times for reaching the final temperature and the final pressure were both set at 60 minutes. At the time reaching a predetermined agitating torque, the reaction system was purged with nitrogen to return to a normal pressure and the condensation polymerization was stopped, the polymer was discharged into a cooled water in a strand-like form and immediately cut to obtain columnar chips with a diameter of about 4 mm and a length of about 6 mm (the equivalent spherical diameter of the polymer was 5.4 mm). Where, the time from start of pressure reduction to reaching the predetermined agitating torque was 2 hours. The intrinsic viscosity of the obtained polymer was 0.500 dl/g, and the amount of cyclic trimer in the polymer was 1.1% by weight.

This polymer was dried at 150° C. under a pressure-reduced condition, and then, it was heat treated at a pressure-reduced condition (not higher than 133 Pa) and at a temperature of 240° C. for 8 hours, thereafter, the polymer was taken out. The intrinsic viscosity of the obtained polymer was 0.620 dl/g. Further, the amount of cyclic trimer in the polymer was 0.30% by weight (this polymer is referred to as "polyester composition (A)").

Example 2

The heat treatment was carried out in a manner similar to that in Example 1 other than a condition where the predetermined torque in Example 1 was set low and after completion of polymerization chips with an intrinsic viscosity of 0.45 dl/g were heat treated, and a polymer with an intrinsic viscosity of 0.58 dl/g and an amount of cyclic trimer of 0.25% by weight was obtained (this polymer is referred to as "polyester composition (B)").

Example 3

The heat treatment was carried out in a manner similar to that in Example 1 other than a condition where the predetermined torque in Example 1 was set low and after completion of polymerization chips with an intrinsic viscosity of 0.40 dl/g were heat treated, and a polymer with an intrinsic viscosity of 0.53 dl/g and an amount of cyclic trimer of 0.20% by weight was obtained (this polymer is referred to as "polyester composition (C)").

Example 4

The heat treatment was carried out in a manner similar to that in Example 1 other than a condition where antimony trioxide was added at a content of 200 ppm as a value converted into an amount of antimony instead of titanium lactate sodium chelate in Example 1 and the obtained chips with an intrinsic viscosity of 0.550 dl/g were heat treated, and a polymer with an intrinsic viscosity of 0.700 dl/g was obtained. The amount of cyclic trimer in the polymer was 0.40% by weight (this polymer is referred to as "polyester composition (D)").

Comparative Example 1

Chips with an intrinsic viscosity of 0.75 dl/g were obtained in the same manner as that in Example 1 other than a condition where the predetermined torque in Example 1 was set high and after completion of polymerization chips with an intrinsic viscosity of 0.600 dl/g were heat treated. The amount of cyclic trimer in the polymer was 0.50% by weight (this polymer is referred to as "polyester composition (E)").

Comparative Example 2

Chips with an intrinsic viscosity of 0.530 dl/g were obtained in the same manner as that in Example 1 other than a condition where without adding magnesium acetate chips with an intrinsic viscosity of 0.450 dl/g were obtained after completion of polymerization and the chips were heat treated.

The amount of cyclic trimer in the polymer was 0.45% by weight (this polymer is referred to as "polyester composition (F)").

Example 5

Polyester composition (A) obtained in Example 1 was dried under a pressure-reduced condition of 133 Pa at 180° C. for 3 hours, supplied to an extruder for a main layer (layer A), melt extruded onto a casting drum, and rapidly cooled and solidified at a condition brought into contact with the casting drum having a surface temperature of 25° C. while applying static electricity onto the casting drum, and a single layer film was prepared. Successively, this non-stretched film was stretched in the longitudinal direction by a roller-type stretching machine at 90° C. at a draw ratio of 3.5 times, and further, stretched in the transverse direction by using a tenter at 105° C. at a draw ratio of 3.5 times, and after heat treatment under a constant length condition at 200° C. for ten seconds, relax treatment was carried out by 2% in the transverse direction, and thus, a single layer polyester film having a thickness of 8 μm was obtained. The property for forming a film was good. When the film thus obtained was served to the forcible oligomer precipitation test, precipitated cyclic trimer almost does not exist and the color tone was good. The result is shown in Table 2.

Example 6

Using two extruders, polyester composition (A) obtained in Example 1 was dried under a pressure-reduced condition of 133 Pa at 180° C. for 3 hours, and supplied to an extruder for a main layer (layer A). Further, after polyester composition (B) obtained in Example 2 was dried under a pressure-reduced condition of 133 Pa at 180° C. for 3 hours, it was supplied to an extruder for a sub layer (layer B) and was joined in a T-die, the polymer was melt extruded from a two-layer die onto a casting drum, it was rapidly cooled and solidified at a condition brought into contact with the casting drum having a surface temperature of 25° C. while applying static electricity onto the casting drum, and a two-layer non-stretched film of A/B type (thickness ratio: 6/1) was prepared. Successively, this non-stretched film was stretched in the longitudinal direction by a roller-type stretching machine at 90° C. at a draw ratio of 3.5 times, and further, stretched in the transverse direction by using a tenter at 105° C. at a draw ratio of 3.5 times, and after heat treatment under a constant length condition at 200° C. for ten seconds, relax treatment was carried out by 2% in the transverse direction, and thus, a laminated polyester film having a thickness of 8 μm was obtained (lamination thickness of layer B: 1.14 μm). The property for forming a film was good. When the film thus obtained was served to the forcible oligomer precipitation test, precipitated cyclic trimer almost does not exist and the color tone was good. The result is shown in Table 2.

Example 7

Polyester composition (D) obtained in Example 4 was dried under a pressure-reduced condition of 133 Pa at 180° C. for 3 hours, supplied to an extruder for a main layer (layer A), melt extruded onto a casting drum, and rapidly cooled and solidified at a condition brought into contact with the casting drum having a surface temperature of 25° C. while applying static electricity onto the casting drum, and a single layer film was prepared. Successively, this non-stretched film was stretched in the longitudinal direction by a roller-type stretching machine at 90° C. at a draw ratio of 3.5 times, and further, stretched in the transverse direction by using a tenter at 105° C. at a draw ratio of 3.5 times, and after heat treatment under a constant length condition at 200° C. for ten seconds, relax treatment was carried out by 2% in the transverse direction, and thus, a single layer polyester film having a thickness of 8 μm was obtained. The property for forming a film was good. When the film thus obtained was served to the forcible oligomer precipitation test, precipitated cyclic trimer almost does not exist and the color tone was good. The result is shown in Table 2.

Comparative Example 3

A polyester composition was supplied to an extruder in the same manner as that in Example 5 other than a condition where the polyester composition (E) obtained in Comparative Example 1 was supplied instead of the polyester composition (A). The extrusion could not be carried out because of too high viscosity, and a film could not be formed.

Comparative Example 4

A polyester composition was supplied to an extruder in the same manner as that in Example 4 other than a condition where the polyester composition (F) obtained in Comparative Example 2 was supplied instead of the polyester composition (A). The property for applying static electricity was bad, air was involved, and the speed for production could not be increased.

TABLE 1

|  | Cyclic trimer Content in polymer (wt %) | Intrinsic viscosity before heat treatment (dl/g) | Intrinsic viscosity after heat treatment (dl/g) | Color tone | | | Number of large foreign materials (number/mg) | Degree of crystallization (%) | $Ma + 2 \times Md - 3 \times Mp$ | Polyester composition |
|---|---|---|---|---|---|---|---|---|---|---|
|  |  |  |  | L | a | b |  |  |  |  |
| Example 1 | 0.30% | 0.5 | 0.62 | 59.5 | 0.1 | 7.5 | 250 | 77 | 4.8 | A |
| Example 2 | 0.25% | 0.45 | 0.58 | 61 | −0.15 | 6.5 | 300 | 80 | 4.8 | B |
| Example 3 | 0.20% | 0.4 | 0.53 | 62 | 0 | 6 | 250 | 85 | 4.8 | C |
| Example 4 | 0.40% | 0.55 | 0.7 | 55 | 2 | 3.5 | 10000 | 70 | 4.2 | D |
| Comparative Example 1 | 0.50% | 0.6 | 0.75 | 60.3 | −0.1 | 8 | 250 | 62 | 4.8 | E |
| Comparative Example 2 | 0.45% | 0.45 | 0.53 | 61 | 3 | 5 | 250 | 65 | −1.0 | F |

TABLE 2

| | Polymer composition | | Amount of precipitation of cyclic trimer (number/mm²) | Note |
|---|---|---|---|---|
| | Layer A | Layer B | | |
| Example 5 | polyester composition A | | 0 | |
| Example 6 | polyester composition A | polyester composition B | 0 | |
| Example 7 | polyester composition D | | 0 | many foreign materials |
| Comparative Example 3 | polyester composition E | | cannot be determined | cannot be formed as a film |
| Comparative Example 4 | polyester composition F | | cannot be determined | cannot be formed as a film |

Example 8

A slurry of 100 kg of high-purity terephthalic acid (produced by Mitsui Chemical Corporation) and 45 kg of ethylene glycol (Japan Catalyst Corporation) was supplied to an esterification bath, which was charged with about 123 kg of bis(hydroxyethyl)terephthalate beforehand and which was kept at a temperature of 250° C. and a pressure of $1.2 \times 10^5$ Pa, in order for 4 hours, and even after completion of the supply, esterification was further carried out for one hour, 123 kg of this esterified product was transferred to a condensation polymerization bath.

Successively, to the above-described condensation polymerization bath transferred with the esterified product, antimony trioxide was added by 0.03 part, thereafter, steric hindrance phenolic compound "IRGANOX1222" (registered trade mark) was added at 350 ppm relative to polymer, magnesium acetate solution was added by 70 ppm at a weight of magnesium atoms, phosphoric acid as a phosphoric compound was added by 10 ppm at a weight of phosphorus atoms, and thereafter, while agitating the low molecular polymer at 30 rpm, the reaction system was gradually heated from 250° C. to 285° C. and the pressure was reduced down to 40 Pa. The times for reaching the final temperature and the final pressure were both set at 60 minutes. At the time reaching a predetermined agitating torque, the reaction system was purged with nitrogen to return to a normal pressure and the condensation polymerization was stopped, the polymer was discharged into a cooled water and immediately cut to obtain columnar chips with a diameter of about 5 mm and a length of about 7 mm (the equivalent spherical diameter of the polymer was 6.4 mm). Where, the time from start of pressure reduction to reaching the predetermined agitating torque was 3 hours.

The intrinsic viscosity of the obtained polymer was 0.650 dl/g, the concentration of carboxylic end group was 25 equivalent/$10^6$ g polymer, and the amount of cyclic trimer in the polymer was 1.3% by weight.

The obtained polymer was dried at 150° C. under a pressure-reduced condition, and then, the inside of the system was turned into a slightly pressurized condition of $1.17 \times 10^5$ Pa by nitrogen gas. The concentration of oxygen in the reaction system was 50 ppm and the moisture was 10 ppm. The system was kept at this pressure (staying condition), and after heat treatment was carried out at a temperature of 240° C. for 9 hours, the polymer was taken out. The intrinsic viscosity of the obtained polymer was 0.645 dl/g, the concentration of carboxylic end group was 28 equivalent/$10^6$ g polymer, and the amount of cyclic trimer in the polymer was 0.40% by weight. The color tone of the polymer was good (polyester composition (G)).

Example 9

Polyethylene terephthalate was synthesized by condensation polymerization in a manner similar to that in Example 8 other than a condition where "PEP45" (registered trade mark) was added by 300 ppm relative to polymer instead of adding "IRGANOX1222", and columnar chips with a diameter of about 5 mm and a length of about 7 mm were obtained (the equivalent spherical diameter of the polymer was 6.4 mm).

The intrinsic viscosity of the obtained polymer was 0.655 dl/g, the concentration of carboxylic end group was 28 equivalent/$10^6$ g polymer, and the amount of cyclic trimer in the polymer was 1.3% by weight.

The obtained polymer was dried at 150° C. under a pressure-reduced condition, and then, the inside of the system was turned into a slightly pressurized condition of $1.17 \times 10^5$ Pa by nitrogen gas. The concentration of oxygen in the system was 50 ppm and the moisture was 10 ppm. The system was kept at this pressure (staying condition), and after heat treatment was carried out at a temperature of 230° C. for 9 hours, the polymer was taken out. The intrinsic viscosity of the obtained polymer was 0.625 dl/g, the concentration of carboxylic end group was 32 equivalent/$10^6$ g polymer, and the amount of cyclic trimer in the polymer was 0.45% by weight (polyester composition (H)).

Example 10

Heat treatment was carried out in the same manner as that in Example 8 other than a condition where the moisture content in the system was changed to 0.5 ppm. The amount of cyclic trimer in the obtained polymer was 0.5% by weight (polyester composition (1)).

Example 11

The polymer with a concentration of cyclic trimer of 1.3% by weight synthesized in Example 8 was dried at 150° C. under a pressure-reduced condition, and then, the inside of the system was turned into a slightly pressurized condition of $1.17 \times 10^5$ Pa by nitrogen gas. The concentration of oxygen in the reaction system was 15 ppm and the moisture was 1,500 ppm. The system was kept at this pressure (staying condition), and after heat treatment was carried out at a temperature of 230° C. for 9 hours, the polymer was taken out. Although the amount of cyclic trimer in the obtained polymer was 0.50% by weight, the intrinsic viscosity of the polymer was 0.530 dl/g, the concentration of carboxylic end group was 50 equivalent/$10^6$ g polymer, and the polymer had a great reduction in viscosity and had a high concentration of carboxylic end group (polyester composition (J)).

Comparative Example 5

Polyethylene terephthalate was synthesized by condensation polymerization in a manner similar to that in Example 8 other than a condition where "IRGANOX1222" was not added, and columnar chips with a diameter of about 5 mm and a length of about 7 mm were obtained (the equivalent spherical diameter of the polymer was 6.4 mm).

The intrinsic viscosity of the obtained polymer was 0.665 dl/g, the concentration of carboxylic end group was 35 equivalent/$10^6$ g polymer, and the amount of cyclic trimer in the polymer was 1.3% by weight.

The obtained polymer was dried at 150° C. under a pressure-reduced condition, and then, the inside of the system was turned into a slightly pressurized condition of $1.17 \times 10^5$ Pa by nitrogen gas. The concentration of oxygen in the system was 50 ppm and the moisture was 10 ppm. The system was kept at this pressure (staying condition), and after heat treatment was carried out at a temperature of 240° C. for 9 hours, the polymer was taken out. The intrinsic viscosity of the obtained polymer was 0.645 dl/g, and the concentration of carboxylic end group was 38 equivalent/106 g polymer. Further, the amount of cyclic trimer in the polymer was 0.45% by weight (polyester composition (K)). In this composition, the polymer chips were colored.

Comparative Example 6

Heat treatment was carried out in a manner similar to that in Example 8 other than a condition where, relatively to the melt polymerized polymer with a concentration of cyclic trimer of 1.3% by weight synthesized in Example 8, nitrogen gas was flowed at a rate of 60 liters per 1 kg of polymer under a normal pressure condition. The amount of cyclic trimer in the obtained polymer was 0.40% by weight. Further, the intrinsic viscosity of the polymer increased up to 0.80 dl/g. The concentration of carboxylic end group was 20 equivalent/$10^6$ g polymer (polyester composition (L)).

Comparative Examples 7 and 8

Heat treatment was carried out in the same manner as that in Example 8 other than a condition where the temperature in the system was changed to 170° C. (Comparative Example 7) or 265° C. (Comparative Example 8). In a case of 170° C., the amount of cyclic trimer was 1.3% by weight, and it was not reduced at all. On the other hand, in a case of 265° C., polymer adhered to the inner wall of the apparatus, the amount of cyclic trimer was 1.2% by weight, and the effect for reduction was not recognized (polyester composition (M) (Comparative Example 7), polyester composition (N) (Comparative Example 8)).

Example 12

Polyester composition (G) obtained in Example 8 was dried under a pressure-reduced condition of 133 Pa at 180° C. for 3 hours, supplied to an extruder for a main layer (layer A), melt extruded onto a casting drum, and rapidly cooled and solidified at a condition brought into contact with the casting drum having a surface temperature of 25° C. while applying static electricity onto the casting drum, and a single layer film was prepared. Successively, this non-stretched film was stretched in the longitudinal direction by a roller-type stretching machine at 90° C. at a draw ratio of 3.5 times, and further, stretched in the transverse direction by using a tenter at 105° C. at a draw ratio of 3.5 times, and after heat treatment under a constant length condition at 200° C. for ten seconds, relax treatment was carried out by 2% in the transverse direction, and thus, a single layer polyester film having a thickness of 8 μm was obtained. The property for forming a film was good. When the film thus obtained was served to the forcible oligomer precipitation test, precipitated cyclic trimer almost does not exist and the color tone was good. The result is shown in Table 4.

Example 13

Using two extruders, polyester composition (G) obtained in Example 8 was dried under a pressure-reduced condition of 133 Pa at 180° C. for 3 hours, and supplied to an extruder for a main layer (layer A). Further, after polyester composition (H) obtained in Example 9 was dried under a pressure-reduced condition of 133 Pa at 180° C. for 3 hours, it was supplied to an extruder for a sub layer (layer B) and was joined in a T-die, the polymer was melt extruded from a two-layer die onto a casting drum, it was rapidly cooled and solidified at a condition brought into contact with the casting drum having a surface temperature of 25° C. while applying static electricity onto the casting drum, and a two-layer non-stretched film of A/B type (thickness ratio: 6/1) was prepared. Successively, this non-stretched film was stretched in the longitudinal direction by a roller-type stretching machine at 90° C. at a draw ratio of 3.5 times, and further, stretched in the transverse direction by using a tenter at 105° C. at a draw ratio of 3.5 times, and after heat treatment under a constant length condition at 200° C. for ten seconds, relax treatment was carried out by 0.2% in the transverse direction, and thus, a laminated polyester film having a thickness of 8 μm was obtained (lamination thickness of layer B: 1.14 μm). The property for forming a film was good. When the film thus obtained was served to the forcible oligomer precipitation test, precipitated cyclic trimer almost does not exist and the color tone was good. The result is shown in Table 4.

Comparative Example 9

A single layer polyester film was obtained in the same manner as that in Example 12 other than a condition where the polyester composition (K) obtained in Comparative Example 5 was supplied instead of the polyester composition (G). The property for forming a film was good. When the film thus obtained was served to the forcible oligomer precipitation test, although precipitated cyclic trimer almost does not exist, the film was colored. The result is shown in Table 4.

Comparative Example 10

A polyester composition was supplied to an extruder in the same manner as that in Example 12 other than a condition where the polyester composition (L) obtained in Comparative Example 6 was supplied instead of the polyester composition (G). The extrusion could not be carried out because of too high viscosity, and a film could not be formed.

Comparative Example 11

A single layer polyester film was obtained in the same manner as that in Example 12 other than a condition where the polyester composition (L) obtained in Comparative Example 6 was supplied instead of the polyester composition (G). The property for forming a film was good. When the film thus obtained was served to the forcible oligomer precipitation test, a large amount of cyclic trimer was precipitated. It is expected that it cannot be fit for use as film because many large protrusions exist. The result is shown in Table 4.

TABLE 3

| | Antioxidant | | Cyclic trimer | Intrinsic | Color tone | | | Amount of carboxylic end group | polyester |
|---|---|---|---|---|---|---|---|---|---|
| | Name of antioxidant | Content (ppm) | Content in polymer (wt %) | viscosity (dl/g) | L | a | b | (equivalent/ton) | composition |
| Example 8 | IRGANOX1222 | 350 | 0.40% | 0.645 | 59.5 | 0.1 | 3.5 | 28 | G |
| Example 9 | PEP45 | 300 | 0.45% | 0.625 | 60.1 | −0.15 | 3 | 32 | H |
| Example 10 | IRGANOX1222 | 350 | 0.50% | 0.66 | 60 | 0 | 3.3 | 26 | I |
| Example 11 | IRGANOX1222 | 350 | 0.50% | 0.53 | 59 | 0.5 | 5 | 50 | J |
| Comparative Example 5 | not added | 0 | 0.45% | 0.645 | 55 | 2 | 12 | 38 | K |
| Comparative Example 6 | IRGANOX1222 | 350 | 0.40% | 0.8 | 60.3 | −0.1 | 2.5 | 20 | L |
| Comparative Example 7 | IRGANOX1222 | 350 | 1.30% | 0.65 | 61 | 0.1 | 3.3 | 25 | M |
| Comparative Example 8 | IRGANOX1222 | 350 | 1.20% | 0.63 | 58 | 1 | 4 | 40 | N |

TABLE 4

| | Polymer composition | | Amount of precipitation of cyclic trimer | |
|---|---|---|---|---|
| | Layer A | Layer B | (number/mm$^2$) | Note |
| Example 12 | polyester composition G | | 0 | |
| Example 13 | polyester composition G | polyester composition H | 0 | |
| Comparative Example 9 | polyester composition K | | 0 | film colored |
| Comparative Example 10 | polyester composition L | | cannot be determined | cannot be formed as a film |
| Comparative Example 11 | polyester composition M | | 200 | Many large protrusions |

Next, the second polyester composition will be shown as follows.

(11) Determination of Cyclic Trimer in Polyester:

1 g of polyester was dissolved in 20 ml of orthochlorophenol, and an internal standard was added. Further, the polymer was precipitated by adding methanol, supernatant liquid was sampled by centrifugal separation, and it was determined using liquid chromatograph.

(12) Determination of Bis(Hydroxyethyl)Terephthalate in Polyester:

0.5 g of polyester was dissolved in 10 ml of hexafluoroisopropanol, and the polymer was precipitated by adding methanol. The polymer was separated by centrifugal separation, supernatant liquid was sampled, and the supernatant liquid was evaporated to dryness. The solid component evaporated to dryness was re-dissolved in 3 ml of DMSO, and an amount of BHT contained in the DMSO solution was determined using liquid chromatograph.

Absorbance of 365 nm Ray:

0.8 g of polyester was dissolved in 10 ml of orthochlorophenol. In a case where particles and the like were contained in polyester, the particles were settled by centrifugal separation of the solution, and its supernatant liquid was served to the determination. Using orthochlorophenol as reference and using a spectrophotometer U3010 produced by Hitachi Co., Ltd., the absorbance at 365 nm was determined.

(14) Forcible Oligomer Precipitation Test:

After a film having a square shape with vertical and transverse sizes of 5 cm was heated in a hot air oven at 150° C. for 30 minutes, the film surface was observed by a scanning electron microscope, and the number of precipitated cyclic trimer having a diameter of not less than 1 μm per 100 μm square was counted.

Example 14

100 parts by weight of terephthalic dimethyl and 62 parts by weight of ethylene glycol were deposited into a transesterification bath and molten at 150° C. Then, 0.05 part by weight of magnesium acetate tetrahydrate was deposited thereinto, and while methanol was distilled, the transesterification was carried out. The temperature of the reacted material was elevated up to 235° C. for 3 hours, and after the transesterification was completed, 0.01 part by weight of orthophosphoric acid was added. Further, 0.1 part by weight of colloidal silica having a mean diameter of 0.3 μm was added, and then, 0.015 part by weight of antimony trioxide was added. Thereafter, the reacted material was transferred to a condensation polymerization bath.

While agitating the low molecular polymer at 30 rpm, the reaction system was gradually heated from 235° C. to 285° C. and the pressure was reduced down to 130 Pa. The times for reaching the final temperature and the final pressure were both set at 90 minutes. At the time reaching a predetermined agitating torque, the reaction system was returned to a normal pressure by nitrogen gas and the condensation polymerization was stopped, the polymer was discharged into a cooled water in a strand-like form and immediately cut to obtain polyester chips. The intrinsic viscosity of the obtained polyester chips was 0.63, and the content of cyclic trimer was 1.2% by weight.

This polyester was dried at 170° C. under a pressure-reduced condition to prepare polyester having a degree of crystallization of 60%. The apparent volume per 1 kg chips was 1.43 liters.

Then, 100 parts by weight of chips finished with drying were charged into a rotary-type heat treatment machine whose capacity of the inside of the bath was 300% of the apparent volume of the chips, the inside was filled with nitrogen gas having a moisture rate of not higher than 40 ppm and an oxygen concentration of not higher than 40 ppm, and the pressure of the inside was controlled at 930 hPa. Then, the temperature of the inside of the bath was elevated, and from the time reaching 230° C., the temperature was kept for 20 hours, and thereafter, the chips were taken out. The intrinsic viscosity of the obtained chips was 0.64, the amount of cyclic trimer was 0.32% by weight, and the degree of crystallization was 75%. The other properties are shown in Tables 5 and 6.

The chips finished in treatment were deposited into an extruder, molten at 285° C., and extruded from a die in a form of a sheet. The molten sheet was cooled by bringing it into contact with a mirror-surface drum, whose surface temperature was controlled at 25° C., by electrostatic application method. Then, the obtained amorphous polyester sheet was stretched in the longitudinal direction at a draw ratio of 3.3 times by stretching rollers heated at 90° C., and thereafter, stretched in the transverse direction at a temperature of 110° C. and a draw ratio of 3.8 times by a tenter-type stretching machine. The film completed in stretching was wound in a form of a roll after being heat set at 230° C. The property for forming a film was good. The thickness of the film was 30 µm, and the content of cyclic trimer contained in the film was 0.49% by weight. When the forcible oligomer precipitation test was carried out, precipitation of oligomer was not observed. The properties are shown in Table 7.

Examples 15 and 16

Films were formed in a manner similar to that in Example 14 other than conditions where the times for heat treatment were changed to 10 hours and 6 hours, respectively.

Examples 17 and 18

In Example 14, only the content of orthophosphoric acid was changed, polymerization was carried out similarly, and after heat treatment, films were formed.

Example 19

A film was formed in a manner similar to that in Example 14 other than a condition where the torque for determining the completion of polymerization was changed. Because the intrinsic viscosity of the polymer was low, it was difficult to control the thickness of the extruded sheet uniformly, and film breakage during film formation also occurred.

Example 22

Polyester chips were obtained in a manner similar to that in Example 14 other than a condition where the raw material of 100 parts by weight of terephthalic dimethyl in Example 14 was changed to 94 parts by weight of terephthalic dimethyl and 6 parts by weight of isophthalic dimethyl. The intrinsic viscosity of the obtained polyester chips was 0.65, and the content of cyclic trimer was 1.0% by weight.

This polyester was dried at 170° C. under a pressure-reduced condition to prepare polyester having a degree of crystallization of 30%. The apparent volume per 1 kg chips was 1.43 liters.

Then, 100 parts by weight of chips finished in drying were charged into a rotary-type heat treatment machine whose capacity of the inside of the bath was 300% of the apparent volume of the chips, the inside was filled with nitrogen gas having a moisture rate of not higher than 40 ppm and an oxygen concentration of not higher than 40 ppm, and the pressure of the inside was controlled at 930 hPa. Then, the temperature of the inside of the bath was elevated, and from the time reaching 230° C., the temperature was kept for 20 hours, and thereafter, the chips were taken out. The intrinsic viscosity of the obtained chips was 0.65, the amount of cyclic trimer was 0.45% by weight, and the degree of crystallization was 60%. The other properties are shown in Tables 5 and 6.

The chips finished in treatment were deposited into an extruder, molten at 285° C., and extruded from a die in a form of a sheet. The molten sheet was cooled by bringing it into contact with a mirror-surface drum, whose surface temperature was controlled at 25° C., by electrostatic application method. Then, the obtained amorphous polyester sheet was stretched in the longitudinal direction at a draw ratio of 3.3 times by stretching rollers heated at 90° C., and thereafter, stretched in the transverse direction at a temperature of 110° C. and a draw ratio of 3.8 times by a tenter-type stretching machine. The film completed in stretching was wound in a form of a roll after being heat set at 230° C. The thickness of the film was 30 µm, and the content of cyclic trimer contained in the film was 0.65% by weight. The result is shown in Table 7.

Example 21

Polyester chips were obtained in a manner similar to that in Example 14 other than a condition where the agitating torque for determining the completion of melt polymerization was set low. The intrinsic viscosity of the polyester chips was 0.60, and the content of cyclic trimer was 1.0% by weight.

This polyester was dried at 170° C. under a pressure-reduced condition to prepare polyester having a degree of crystallization of 60%. The apparent volume per 1 kg chips was 1.43 liters.

Then, 100 parts by weight of chips finished in drying were charged into a rotary-type heat treatment machine whose capacity of the inside of the bath was 300% of the apparent volume of the chips, the inside was filled with nitrogen gas having a moisture rate of not higher than 40 ppm and an oxygen concentration of not higher than 40 ppm, and the pressure of the inside was controlled at 650 hPa. Then, the temperature of the inside of the bath was elevated, and from the time reaching 230° C., the temperature was kept for 20 hours, and thereafter, the chips were taken out. The intrinsic viscosity of the obtained chips was 0.63, the amount of cyclic trimer was 0.32% by weight, and the degree of crystallization was 75%. The content of bis(hydroxyethyl)terephthalate was 40 ppm. The other properties are shown in Tables 5 and 6.

The chips finished in treatment were deposited into an extruder, molten at 285° C., and extruded from a die in a form of a sheet. The molten sheet was cooled by bringing it into contact with a mirror-surface drum, whose surface temperature was controlled at 25° C., by electrostatic application method. Then, the obtained amorphous polyester sheet was stretched in the longitudinal direction at a draw ratio of 3.3 times by stretching rollers heated at 90° C., and thereafter, stretched in the transverse direction at a temperature of 110°

C. and a draw ratio of 3.8 times by a tenter-type stretching machine. The film completed in stretching was wound in a form of a roll after being heat set at 230° C. The thickness of the film was 30 µm, and the content of cyclic trimer contained in the film was 0.49% by weight. When the forcible oligomer precipitation test was carried out, precipitation of oligomer was not observed. The result is shown in Table 7.

Example 22

Polyester was polymerized in a manner similar to that in Example 14 other than a condition where the content of antimony trioxide in Example 14 was changed to 0.02 part by weight, and further, drying and heat treatment of the chips and film formation were carried out. Because the amount of antimony element was much, cyclic trimer was regenerated during film formation, and the amount of cyclic trimer in the film increased.

Example 23

100 parts by weight of terephthalic dimethyl and 62 parts by weight of ethylene glycol were deposited into a transesterification bath and molten at 150° C. Then, 0.05 part by weight of magnesium acetate tetrahydrate was deposited thereinto, and while methanol was distilled, the transesterification was carried out. The temperature of the reacted material was elevated up to 235° C. for 3 hours, and after the transesterification was completed, 0.01 part by weight of orthophosphoric acid was added. Further, 0.1 part by weight of colloidal silica having a mean diameter of 0.3 µm was added, and then, titanium lactate sodium chelate compound prepared Reference Example was added so that titanium element was 5 ppm (weight) relative to terephthalic dimethyl. Thereafter, the reacted material was transferred to a condensation polymerization apparatus.

While agitating the low molecular polymer at 30 rpm, the reaction system was gradually heated from 235° C. to 285° C. and the pressure was reduced down to 130 Pa. The times for reaching the final temperature and the final pressure were both set at 90 minutes. At the time reaching a predetermined agitating torque, the reaction system was returned to a normal pressure by nitrogen gas and the condensation polymerization was stopped, the polymer was discharged into a cooled water in a strand-like form and immediately cut to obtain polyester chips. The intrinsic viscosity of the obtained polyester chips was 0.64, and the content of cyclic trimer was 1.2% by weight.

This polyester was dried at 170° C. under a pressure-reduced condition to prepare polyester having a degree of crystallization of 60%. The apparent volume per 1 kg chips was 1.43 liters.

Then, 100 parts by weight of chips finished in drying were charged into a rotary-type heat treatment machine whose capacity of the inside of the bath was 300% of the apparent volume of the chips, the inside was filled with nitrogen gas having a moisture rate of not higher than 40 ppm and an oxygen concentration of not higher than 40 ppm, and the pressure of the inside was controlled at 930 hPa. Then, the temperature of the inside of the bath was elevated, and from the time reaching 230° C., the temperature was kept for 20 hours, and thereafter, the chips were taken out. The intrinsic viscosity of the obtained chips was 0.64, the amount of cyclic trimer was 0.36% by weight, and the degree of crystallization was 70%. The other properties are shown in Tables 5 and 6.

The chips finished in treatment were deposited into an extruder, molten at 285° C., and extruded from a die in a form of a sheet. The molten sheet was cooled by bringing it into contact with a mirror-surface drum, whose surface temperature was controlled at 25° C., by electrostatic application method. Then, the obtained amorphous polyester sheet was stretched in the longitudinal direction at a draw ratio of 3.3 times by stretching rollers heated at 90° C., and thereafter, stretched in the transverse direction at a temperature of 110° C. and a draw ratio of 3.8 times by a tenter-type stretching machine. The film completed in stretching was wound in a form of a roll after being heat set at 230° C. The thickness of the film was 30 µm, and the content of cyclic trimer contained in the film was 0.50% by weight. When the forcible oligomer precipitation test was carried out, precipitation of oligomer was not observed. The properties are shown in Table 7.

Example 24

Melt polymerization was carried out similarly in Example 14, and the condition of cutting was changed to change the shape of chips. The intrinsic viscosity of the obtained polyester was 0.64, and the content of cyclic trimer was 1.2% by weight. This polyester was dried at 170° C. under a pressure-reduced condition to prepare polyester having a degree of crystallization of 60%. The apparent volume per 1 kg chips was 1.0 liter.

Then, a film was formed, carrying out heat treatment at a condition similar to that in Example 14. Because the bulk specific gravity of chips was 1.0, coloring was observed by heat treatment.

Examples 25 to 27

Polyester chips were obtained in a manner similar to that in Example 14 other than conditions where the agitating torques for determining the completion of melt polymerization were set high, and after carrying out heat treatment similarly to in Example 14, films were obtained.

Example 28

Heat treatment was carried out in a manner similar to that in Example 14 other than a condition where the ratio between the capacity of the inside of the heat treatment machine in Example 14 and the apparent volume of the chips was changed from 300% to 200%, and a film was formed.

Example 29

Heat treatment was carried out in a manner similar to that in Example 14 other than a condition where the ratio between the capacity of the inside of the heat treatment machine in Example 14 and the apparent volume of the chips was changed from 300% to 120%, and a film was formed.

Example 30

A film was formed in a manner similar to that in Example 14 other than a condition where the heat treatment condition in Example 14 was changed to an atmosphere pressure of 0.3 MPa and a nitrogen flowing amount of 2 liters/hr. per 1 kg polyester. Scratches were slightly observed in the obtained film.

Example 31

Heat treatment was carried out in a manner similar to that in Example 30 other than a condition where the nitrogen flowing amount in Example 30 was changed to 1 liter/hr., and a film was formed.

Example 32

Heat treatment was carried out in a manner similar to that in Example 30 other than a condition where the atmosphere pressure in Example 30 was changed to 0.1 MPa, and a film was formed. Scratches were slightly observed in the obtained film.

Example 33

A two-layer lamination film forming machine having two extruders was prepared. Each of chips heat treated in Example 14 and chips only dried without carrying out heat treatment were supplied to each of the respective two extruders, and they were melt extruded, respectively. The molten polymers were laminated in a lamination block in a two-layer form, and it was extruded from a die in a form of a sheet. At that time, the non-heat treated polymer was laminated on the side of a mirror-surface cooling drum, and the heat treated polymer was laminated on the non-drum side. The ratio of lamination was set at heat treated polymer/non-heat treated polymer=1:5. The obtained amorphous laminated polyester sheet was stretched and heat treated in the same conditions as those in Example 14.

Example 34

The non-heat treated chips in Example 14 were used. The polyester chips were dried at 170° C. under a pressure-reduced condition to prepare polyester chips having a degree of crystallization of 60%. The apparent volume per 1 kg polyester chips was 1.43 liters.

Then, 100 parts by weight of polyester chips finished in drying were charged into a rotary-type heat treatment machine whose capacity of the inside of the bath was 300% of the apparent volume of the chips, the inside was filled with nitrogen gas having a moisture rate of not higher than 40 ppm and an oxygen concentration of not higher than 40 ppm, and the pressure of the inside of the bath was controlled at an atmospheric pressure. Then, the temperature of the inside of the bath was elevated under a condition where nitrogen gas was not flowed, and from the time reaching 230° C., heat treatment was carried out for 30 minutes (Process A).

When the time of 30 minutes passed, the inside of the bath was reduced in pressure, and when the pressure became 130 Pa or lower, nitrogen gas was flowed again in the bath and the inside of the bath was turned to an atmospheric pressure. The time from starting to reduce the pressure in the bath to again filling the bath with nitrogen gas was 5 minutes (Process B).

Further, 30 minutes of heat treatment and 5 minutes of replacing the gas in the bath were repeated alternately, and totally heat treatment of 19 hours and 50 minutes was carried out.

The intrinsic viscosity of the obtained chips was 0.65, the amount of cyclic trimer was 0.32% by weight, and the degree of crystallization was 75%. The other properties are shown in Tables 8 and 9.

The chips finished in treatment were formed to a film at the same conditions as those in Example 14. The result is shown in Table 10.

Example 35

A film was formed in the same manner as that in Example 34 other than conditions where the treatment time of Process A in Example 34 was set at 30 minutes, the time of Process B was changed to 15 minutes, the final process was set to be Process A, and the polyester was heat treated totally for 20 hours. The result is shown in Tables 8 to 10.

Example 36

A polyester film was formed in the same manner as that in Example 34 other than conditions where the treatment time of Process A in Example 34 was changed to 2 hours, the time of Process B was set at 5 minutes, the time of the final Process A was set at 75 minutes, and the polyester was heat treated totally for 20 hours. The result is shown in Tables 8 to 10.

Example 37

A polyester film was formed in the same manner as that in Example 34 other than conditions where the treatment time of Process A in Example 34 was changed to 10 hours, and the polyester was heat treated totally for 20 hours and 5 minutes. The result is shown in Tables 8 to 10.

Comparative Example 12

A film was obtained formed in the same manner as that in Example 14 other than a condition where the heat treatment was not carried out. The amount of cyclic trimer in the film was 1.2% by weight, and the number of oligomer precipitation was 50/100 m □.

Comparative Example 13

The polyester chips polymerized in Example 14 were dried at 170° C. under a pressure-reduced condition to prepare polyester having a degree of crystallization of 60%. The apparent volume per 1 kg chips was 1.43 liters. Then, 100 parts by weight of chips finished in drying were charged into a rotary-type heat treatment machine whose capacity of the inside of the bath was 300% of the apparent volume of the chips, and the pressure of the inside was controlled at 100 Pa. Then, the temperature of the inside of the bath was elevated, and from the time reaching 230° C., the temperature was kept for 20 hours, and thereafter, the chips were taken out. The intrinsic viscosity of the obtained chips was 1.0, the amount of cyclic trimer was 0.35% by weight, and the degree of crystallization was 75%. The other properties are shown in Tables 8 and 9.

The chips finished in treatment were deposited into an extruder, molten at 285° C., and extruded from a die in a form of a sheet. At that time, because the intrinsic viscosity of the chips was high, the exothermic amount due to shear in the extruder was great, and the temperature of the molten polymer was higher than 300° C. The molten sheet was cooled by bringing it into contact with a mirror-surface drum, whose surface temperature was controlled at 25° C., by electrostatic application method. Then, although the film was formed at conditions similar to those in Example 14, the property for forming a film was poor, and film breakage occurred frequently. Therefore, the film obtained was corresponding to about 20% (weight ratio) of the polymer used. Further, because the amount of carboxylic end group of the polyester chips served to the film formation was little, the contact property with rollers was not sufficient, and scratches were sometimes observed on the film surface. The content of cyclic trimer contained in the film was 0.75% by weight. The properties are shown in Table 10.

Comparative Example 14

A film was obtained in a manner similar to that in Example 14 other than conditions where the pressure of nitrogen gas in the heat treatment was controlled at 0.15 MPa and the flowing amount thereof was set at 0.5 liter/hr. per 1 kg polyester. The polyester finished in heat treatment was colored, and the color tone of the film was also yellowish.

Comparative Example 15

A film was obtained in a manner similar to that in Example 14 other than a condition where the temperature of the heat treatment was changed to 180° C. The amount of cyclic trimer was not reduced at all.

Comparative Example 16

A film was obtained in a manner similar to that in Example 14 other than a condition where the temperature of the heat treatment was changed to 255° C. The chips were fused to each other in the heat treatment machine and became an aggregate-like condition. Further, the chips were colored to be brown. Because the chips became an aggregate-like condition, film formation could not be carried out.

Comparative Example 17

Chips were obtained in a manner similar to that in Example 14 other than a condition where the torque for determining the completion of melt polymerization was set small, and after heat treatment carried out in a manner similar to that in Example 14, a film was formed. However, because the intrinsic viscosity was too low, the width of the extruded sheet was not stable, and further, because the extruded sheet was fragile, film formation could not be carried out.

TABLE 5

| | Polymer properties before heat treatment | | |
|---|---|---|---|
| | Intrinsic viscosity | Amount of cyclic trimer (wt %) | Amount of carboxylic end group (equivalent/ton) |
| Example 14 | 0.63 | 1.2 | 20 |
| Example 15 | 0.63 | 1.2 | 20 |
| Example 16 | 0.63 | 1.2 | 20 |
| Example 17 | 0.64 | 1.2 | 30 |
| Example 18 | 0.64 | 1.2 | 35 |
| Example 19 | 0.57 | 1.0 | 18 |
| Example 20 | 0.65 | 1.0 | 22 |
| Example 21 | 0.60 | 1.0 | 16 |
| Example 22 | 0.63 | 1.2 | 25 |
| Example 23 | 0.64 | 1.2 | 22 |
| Example 24 | 0.64 | 1.2 | 20 |
| Example 25 | 0.70 | 1.2 | 30 |
| Example 26 | 0.75 | 1.2 | 32 |
| Example 27 | 0.80 | 1.2 | 33 |
| Example 28 | 0.63 | 1.2 | 20 |

TABLE 6

| | Polymer properties after heat treatment | | | | | | |
|---|---|---|---|---|---|---|---|
| | Intrinsic viscosity | Amount of cyclic trimer (wt %) | Amount of carboxylic end group (equivalent/ton) | Absorbance at 365 nm | Amount of BHT(ppm) | Degree of crystallization (%) | Catalyst for polymerization/ Content (ppm) |
| Example 14 | 0.64 | 0.32 | 20 | 0.24 | 110 | 75 | Sb/120 |
| Example 15 | 0.64 | 0.42 | 20 | 0.23 | 120 | 75 | Sb/120 |
| Example 16 | 0.64 | 0.58 | 20 | 0.23 | 120 | 75 | Sb/120 |
| Example 17 | 0.63 | 0.30 | 32 | 0.28 | 130 | 75 | Sb/120 |
| Example 18 | 0.62 | 0.30 | 38 | 0.29 | 130 | 75 | Sb/120 |
| Example 19 | 0.56 | 0.28 | 19 | 0.23 | 160 | 80 | Sb/120 |
| Example 20 | 0.65 | 0.45 | 24 | 0.26 | 150 | 60 | Sb/120 |
| Example 21 | 0.63 | 0.32 | 17 | 0.22 | 40 | 75 | Sb/120 |
| Example 22 | 0.64 | 0.30 | 28 | 0.25 | 120 | 75 | Sb/165 |
| Example 23 | 0.64 | 0.36 | 25 | 0.30 | 115 | 70 | Ti/5 |
| Example 24 | 0.63 | 0.35 | 30 | 0.35 | 120 | 75 | Sb/120 |
| Example 25 | 0.70 | 0.45 | 35 | 0.32 | 100 | 65 | Sb/120 |
| Example 26 | 0.75 | 0.45 | 33 | 0.32 | 100 | 65 | Sb/120 |
| Example 27 | 0.80 | 0.45 | 35 | 0.33 | 100 | 65 | Sb/120 |
| Example 28 | 0.63 | 0.32 | 25 | 0.27 | 110 | 75 | Sb/120 |

Note)
In the Table, BHT represents bis (hydroxyethyl) terephthalate.

TABLE 7

| | Film properties | |
|---|---|---|
| | Amount of cyclic trimer (wt %) | Amount of precipitation of oligomer (number/100 μm□) |
| Example 14 | 0.49 | 0 |
| Example 15 | 0.59 | 12 |
| Example 16 | 0.68 | 20 |
| Example 17 | 0.51 | 0 |
| Example 18 | 0.53 | 0 |
| Example 19 | 0.45 | 0 |
| Example 20 | 0.65 | 15 |
| Example 21 | 0.49 | 0 |
| Example 22 | 0.60 | 12 |
| Example 23 | 0.50 | 0 |
| Example 24 | 0.50 | 0 |
| Example 25 | 0.63 | 10 |
| Example 26 | 0.65 | 17 |
| Example 27 | 0.68 | 20 |
| Example 28 | 0.49 | 0 |

TABLE 8

| | Polymer properties before heat treatment | | |
|---|---|---|---|
| | Intrinsic viscosity | Amount of cyclic trimer (wt %) | Amount of carboxylic end group (equivalent/ton) |
| Example 29 | 0.63 | 1.2 | 20 |
| Example 30 | 0.63 | 1.2 | 20 |
| Example 31 | 0.63 | 1.2 | 20 |
| Example 32 | 0.63 | 1.2 | 20 |
| Example 33 | 0.63 | 1.2 | 20 |
| Example 34 | 0.63 | 1.2 | 20 |
| Example 35 | 0.63 | 1.2 | 20 |
| Example 36 | 0.63 | 1.2 | 20 |
| Example 37 | 0.63 | 1.2 | 20 |
| Comparative Example 12 | 0.63 | 1.2 | 20 |
| Comparative Example 13 | 0.63 | 1.2 | 20 |
| Comparative Example 14 | 0.63 | 1.2 | 20 |
| Comparative Example 15 | 0.63 | 1.2 | 20 |
| Comparative Example 16 | 0.63 | 1.2 | 20 |
| Comparative Example 17 | 0.50 | 1.0 | 18 |

TABLE 9

| | Polymer properties after heat treatment | | | | | | |
|---|---|---|---|---|---|---|---|
| | Intrinsic viscosity | Amount of cyclic trimer (wt %) | Amount of carboxylic end group (equivalent/ton) | Absorbance at 365 nm | Amount of BHT (ppm) | Degree of crystallization (%) | Catalyst for polymerization/Content (ppm) |
| Example 29 | 0.63 | 0.33 | 28 | 0.31 | 110 | 75 | Sb/120 |
| Example 30 | 0.65 | 0.32 | 15 | 0.28 | 90 | 75 | Sb/120 |
| Example 31 | 0.64 | 0.33 | 18 | 0.30 | 105 | 75 | Sb/120 |
| Example 32 | 0.68 | 0.30 | 15 | 0.27 | 110 | 75 | Sb/120 |
| Example 33 | 0.64 | 0.32 | 20 | 0.24 | 110 | 75 | Sb/120 |
| Example 34 | 0.65 | 0.32 | 20 | 0.23 | 130 | 75 | Sb/120 |
| Example 35 | 0.66 | 0.32 | 18 | 0.22 | 50 | 75 | Sb/120 |
| Example 36 | 0.63 | 0.32 | 20 | 0.25 | 100 | 75 | Sb/120 |
| Example 37 | 0.62 | 0.33 | 35 | 0.29 | 130 | 75 | Sb/120 |
| Comparative Example 12 | — | — | — | — | — | — | Sb/120 |
| Comparative Example 13 | 1.0 | 0.35 | 5 | 0.23 | 20 | 75 | Sb/120 |
| Comparative Example 14 | 0.60 | 0.33 | 40 | 0.38 | 100 | 75 | Sb/120 |
| Comparative Example 15 | 0.63 | 1.2 | 20 | 0.24 | 115 | 50 | Sb/120 |
| Comparative Example 16 | 0.58 | 1.1 | 60 | 0.40 | 150 | 80 | Sb/120 |
| Comparative Example 17 | 0.51 | 0.28 | 18 | 0.23 | 150 | 80 | Sb/120 |

Note)
In the Table, BHT represents bis (hydroxyethyl) terephthalate.

TABLE 10

| | Film properties | |
|---|---|---|
| | Amount of cyclic trimer (wt %) | Amount of precipitation of oligomer (number/100 μm□) |
| Example 29 | 0.49 | 0 |
| Example 30 | 0.52 | 5 |
| Example 31 | 0.50 | 0 |
| Example 32 | 0.50 | 0 |
| Example 33 | 1.1 | non-drum surface: 0 / drum surface: 25 |
| Example 34 | 0.50 | 0 |
| Example 35 | 0.50 | 0 |
| Example 36 | 0.49 | 0 |
| Example 37 | 0.50 | 0 |
| Comparative Example 12 | 1.2 | 50 |
| Comparative Example 13 | 0.75 | 30 |
| Comparative Example 14 | 0.50 | 2 |
| Comparative Example 15 | 1.2 | 48 |
| Comparative Example 16 | — | — |
| Comparative Example 17 | — | — |

INDUSTRIAL APPLICATIONS OF THE INVENTION

The polyester resin composition according to the present invention can be effectively used for a formed body such as a fiber, a film or a bottle. Further, the polyester film according to the present invention is effective, particularly, for use as magnetic tapes, optical films, containers for foods, and for lamination with steel plate or wrapping, or as electric insulation films.

The invention claimed is:
1. A polyester resin composition having a content of a cyclic trimer is in a range of 0.1 to 0.7% by weight, a content of a carboxylic end group is in a range of 15 to 40 equivalent/ton, an intrinsic viscosity is in a range of 0.55 to 0.80 dl/g, and an absorbance at a wavelength of 365 nm of a solution prepared using orthochlorophenol as a solvent (0.8 g/10 ml) is in a range of 0.22 to 0.36, wherein the polyester resin composition has a content of bis(hydroxyethyl)terephthalate in a range of 90 to 200 ppm.

2. The polyester resin composition according to claim 1, wherein the polyester is formed from polyester forming units and not less than 90 mol % of the polyester forming units are units of ethylene terephthalate.

3. The polyester resin composition according to claim 1, wherein the polyester resin composition contains antimony element in an amount of 30 to 150 ppm, and contains an alkaline earth metal element in an amount of 1 to 80 ppm.

4. The polyester resin composition according to claim 1, wherein the polyester resin composition contains titanium element in an amount of 0.5 to 50 ppm.

5. The polyester resin composition according to claim 1, wherein the resin has a degree of crystallization in a range of 50 to 95%, and a bulk density in a range of 0.5 to 1.0 kg/liter.

6. A polyester film formed by a polyester resin composition of claim 1.

7. A magnetic recording medium containing the polyester film according to claim 6.

8. A steel plate laminated to the polyester film according to claim 6.

9. An optical base material containing the polyester film according to claim 6.

10. A laminated polyester film formed by a polyester resin composition of claim 1.

11. A process for producing a polyester resin composition wherein a polyester having an intrinsic viscosity of 0.4 to 0.7 dl/g and a degree of crystallization of not less than 30% is heated at a temperature of 190° C. to 250° C. for 0.5 to 60 hours under an inert gas atmosphere having a pressure of 650 to 1,020 hPa to produce a polyester resin composition having a content of a cyclic trimer in a range of 0.1 to 0.7% by weight, a content of a carboxylic end group in a range of 15 to 40 equivalent/ton, an intrinsic viscosity in a range of 0.55 to 0.80 dl/g, and an absorbance at a wavelength of 365 nm of a solution prepared using orthochlorophenol as a solvent (0.8 g/10 ml) in a range of 0.22 to 0.36 wherein the polyester resin composition has a content of bis(hydroxyethyl)terephthalate in a range of 90 to 200 ppm.

12. The process of claim 11, wherein a polyester having an intrinsic viscosity of 0.4 to 0.7 and a degree of crystallization of not less than 30% is heated at a temperature of 190° C. to 250° C. for 0.5 to 60 hours, while an inert gas at a pressure of 1,020 hPa to 0.5 MPa flows at not less than 1 liter/hr per 1 kg of said polyester.

13. The process of claim 11, wherein a cycle including a process (A) for heat treating a polyester at a temperature of 190° C. to 250° C. for 15 minutes to 10 hours under a condition of an inert gas atmosphere having a degree of flow of inert gas of not more than 1 liter/hr per 1 kg of said polyester and a process (B) for renewing said inert gas atmosphere by replacing said inert gas atmosphere within 15 minutes is repeated, and the total time of said processes (A) and (B) is set at 0.5 to 60 hours.

14. The process for producing a polyester resin composition according to claim 11, wherein a heating bath is used for heating said polyester, and a capacity of said heating bath is set at not less than 150% of an apparent volume of said polyester.

* * * * *